United States Patent
Krekoukis

(10) Patent No.: US 10,071,270 B2
(45) Date of Patent: Sep. 11, 2018

(54) SPRAY JET DISCHARGING DEVICE

(71) Applicant: Ioannis Krekoukis, Zakynthos (GR)

(72) Inventor: Ioannis Krekoukis, Zakynthos (GR)

(*) Notice: Subject to any disclaimer, the term of this patent is extended or adjusted under 35 U.S.C. 154(b) by 0 days.

(21) Appl. No.: 15/310,750

(22) PCT Filed: May 25, 2015

(86) PCT No.: PCT/GR2015/000027
§ 371 (c)(1),
(2) Date: Nov. 12, 2016

(87) PCT Pub. No.: WO2015/181572
PCT Pub. Date: Dec. 3, 2015

(65) Prior Publication Data
US 2017/0080266 A1    Mar. 23, 2017

(30) Foreign Application Priority Data

May 26, 2014 (GR) ............................... 20140100294

(51) Int. Cl.
*A62C 3/02* (2006.01)
*A62C 25/00* (2006.01)
*A62C 27/00* (2006.01)
(Continued)

(52) U.S. Cl.
CPC ......... *A62C 3/0207* (2013.01); *A01M 7/0014* (2013.01); *A01M 7/0021* (2013.01);
(Continued)

(58) Field of Classification Search
CPC ... A62C 3/0207; A62C 3/0228; A62C 3/0242; A62C 25/00; A62C 27/00; A62C 31/24;
(Continued)

(56) References Cited

U.S. PATENT DOCUMENTS 3,128,036 A * 4/1964 McBride .............. A62C 3/0207
169/52
3,446,424 A * 5/1969 Wolford .................. A01M 7/00
239/232
(Continued)

FOREIGN PATENT DOCUMENTS

WO    WO 2006/087608 A2    8/2006

OTHER PUBLICATIONS

International search report in application No. PCT/GR2015/000027, dated Sep. 21, 2015.
Written Opinion in application No. PCT/GR2015/000027, dated Sep. 21, 2015.

*Primary Examiner* — Darren W Gorman
(74) *Attorney, Agent, or Firm* — Oppedahl Patent Law Firm LLC

(57) ABSTRACT

A spray jet discharging device of long range, whose function is based on the production of a powerful air stream with liquid droplets dispersed therein, the maximum velocity of the spray jet being at least 300 km/h. The air stream is produced by a centrifugal fan with a spiral housing (1). The device is mainly used for fire extinguishing. It may be mounted at fixed points or on land vehicles via a suitable support for the fan, which enables both rotation of the spray jet beam in the horizontal plane, and changing of its inclination angle in the vertical plane. It may be remotely controlled (10) or manually operated (60). There is also a version of the device for aerial fire-fighting operations (90), configured to be suspended from an aircraft, e.g. a helicopter, and a device for portable use (1 10), which can be carried by a fireman.

20 Claims, 21 Drawing Sheets

(51) Int. Cl.
*A62C 31/24* (2006.01)
*A62C 99/00* (2010.01)
*B05B 7/24* (2006.01)
*A01M 7/00* (2006.01)

(52) U.S. Cl.
CPC ............ *A62C 3/0242* (2013.01); *A62C 25/00* (2013.01); *A62C 27/00* (2013.01); *A62C 31/24* (2013.01); *A62C 99/0072* (2013.01)

(58) Field of Classification Search
CPC ............ A62C 99/0072; A01M 7/0014; A01M 7/0017; A01M 7/0021; B05B 7/0075; B05B 7/0093; B05B 7/2402; B05B 7/2416; B05B 7/2424; B05B 7/2491; B05B 7/2494
See application file for complete search history.

(56) References Cited

U.S. PATENT DOCUMENTS

| | | | | |
|---|---|---|---|---|
| 4,595,142 | A * | 6/1986 | Kawaharazuka ... | A01M 7/0021 239/373 |
| 5,299,737 | A * | 4/1994 | McGinnis ............ | B05B 7/0075 239/112 |
| 7,140,449 | B1 * | 11/2006 | Ebner .................. | A62C 3/0207 169/12 |
| 7,344,091 | B2 * | 3/2008 | Caccaviello ........ | A01M 7/0014 239/166 |
| 2003/0062174 | A1 * | 4/2003 | Passoni ................ | A62C 3/0207 169/46 |
| 2009/0044835 | A1 | 2/2009 | Peters | |

* cited by examiner

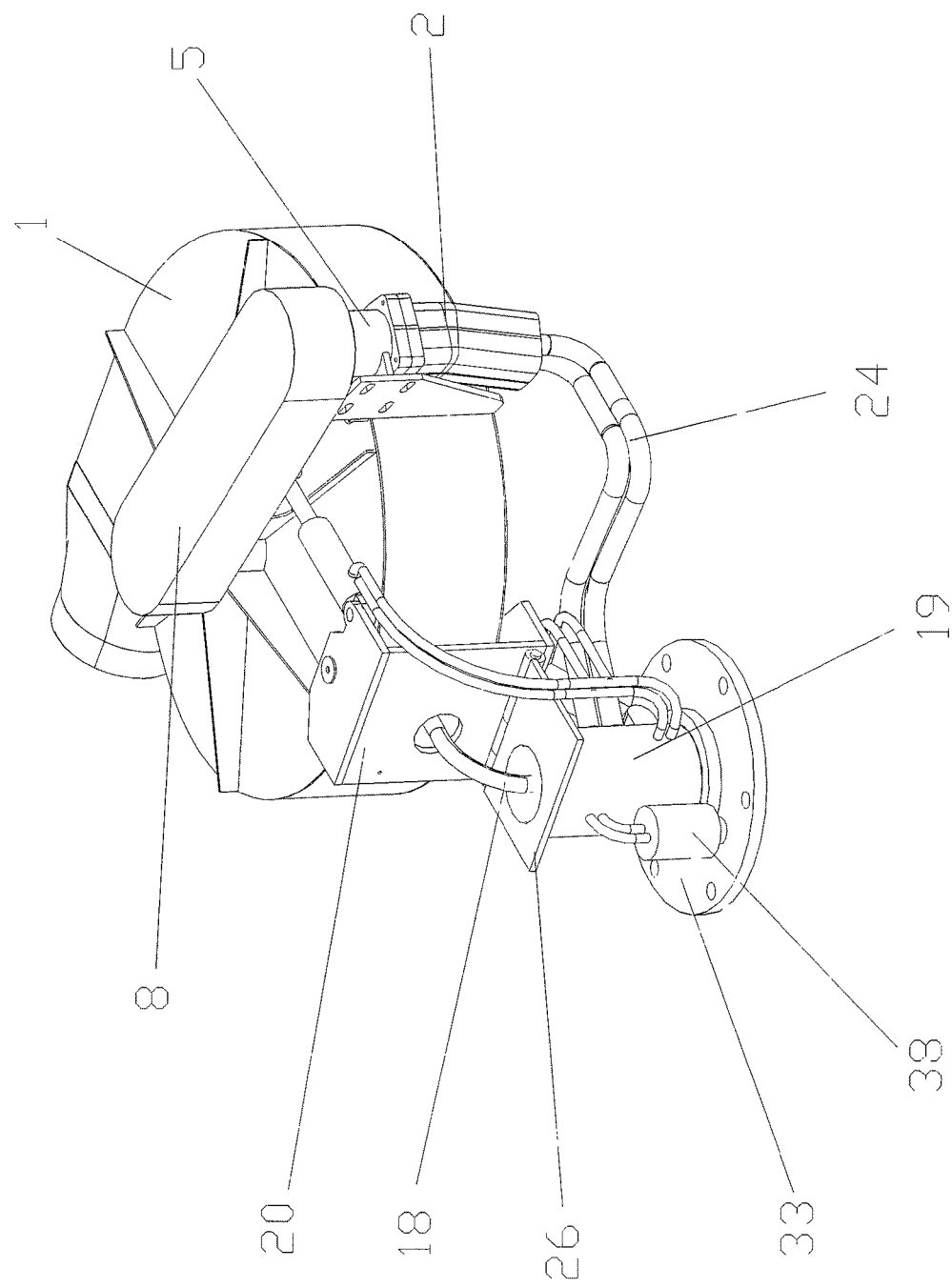

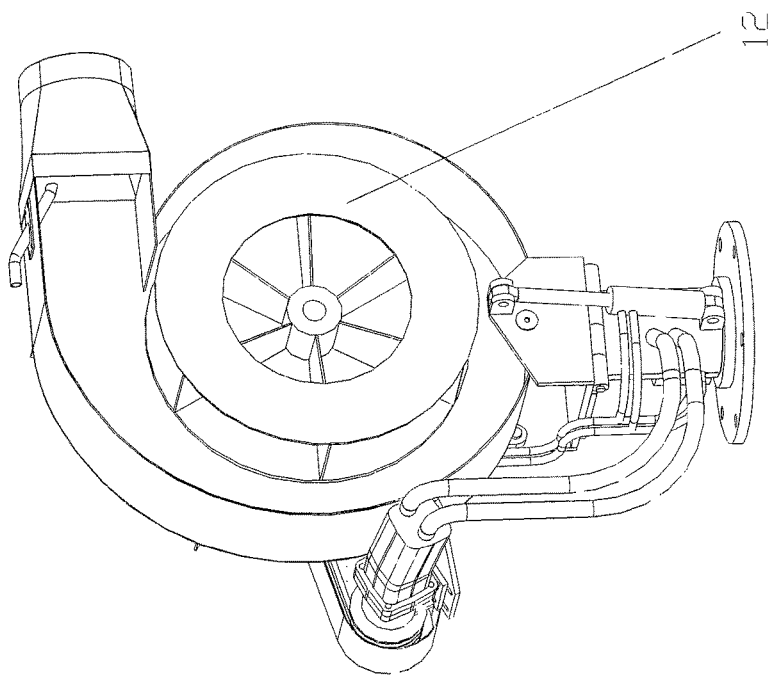
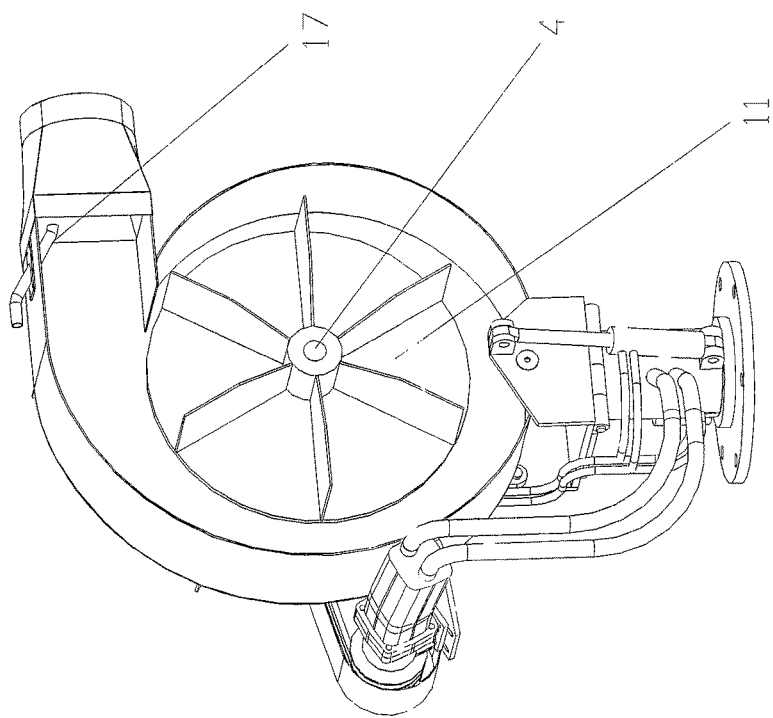

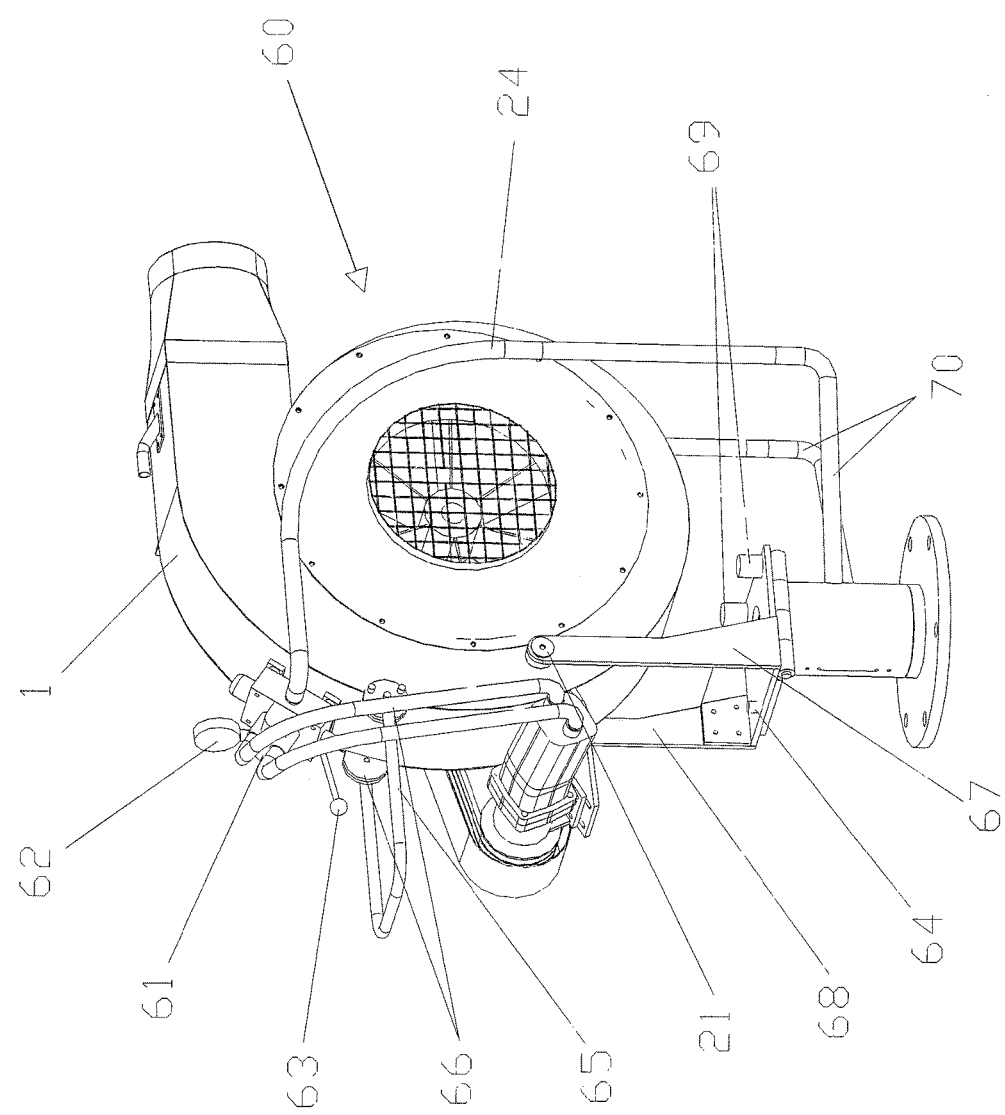

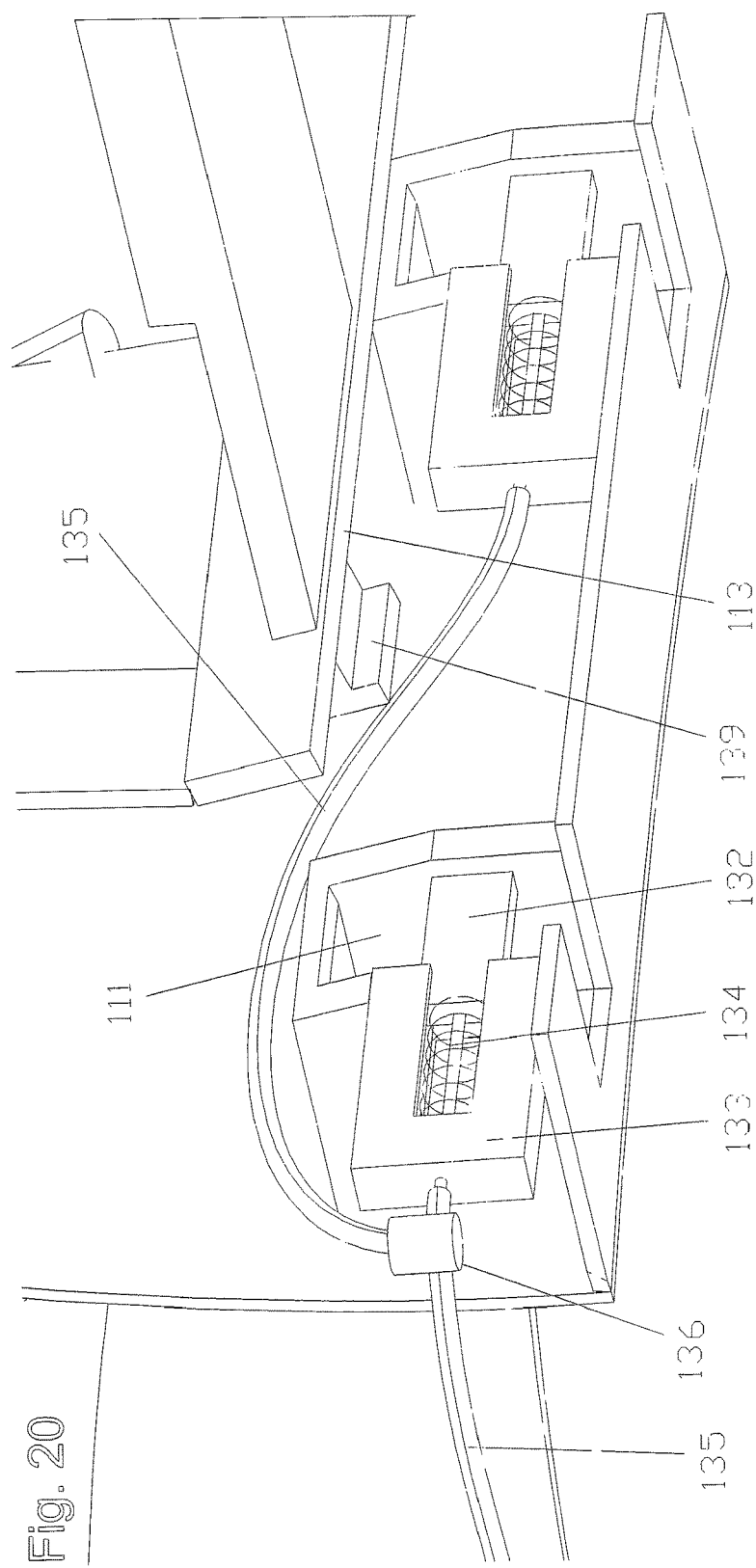

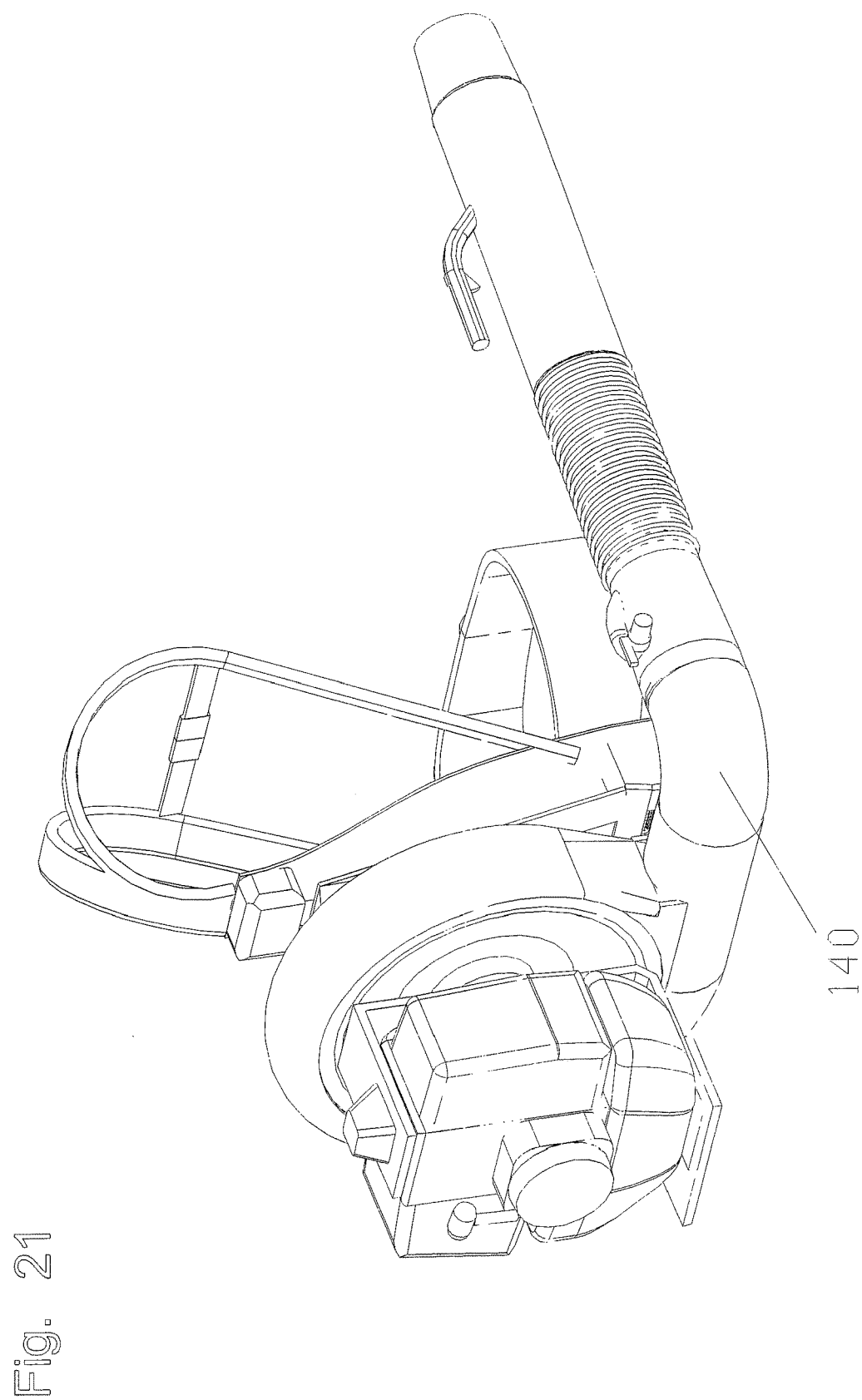

SPRAY JET DISCHARGING DEVICE

TECHNICAL FIELD

Disclosure of the Invention

The present invention relates to a spray jet discharging device whose function is based on the production of a powerful air stream with liquid droplets dispersed therein, the maximum velocity of the spray jet being at least 300 km/h (83.3 m/s).

The device is mainly used to tackle fires which break out either in populated areas or in fields used for agricultural purposes, grass lands and forests. The spray, containing droplets of water or other liquid fire extinguishing medium, is discharged in the form of a jet beam, aimed either directly into the burning area or above it, whereafter the droplets fall on the flames like rain. In any case, effective wetting of a wide area, cooling and finally putting out of the fire are achieved.

Furthermore, the spray jet produced may intercept the advance of the fire due to its high velocity, overcoming even the wind which may help the fire move forward. Hence the flames are not allowed to reach new combustible materials and eventually die out.

Finally, the significant force of the spray jet is capable of driving the fire smoke away from the area around the device operator and dispersing it, thus eliminating the likelihood of suffocation and allowing him to work more comfortably and safely.

Hereafter the device shall be described in accordance with its principal use as a fire extinguishing device. Besides, the present invention began as an evolution of the fire extinguishing devices put forward in patent GR1007732 (Krekoukis). However, in the course of developing the invention it was realised that it could be applied elsewhere too, as mentioned at the end of this description. Such other uses of the device are also claimed in the present application.

The powerful air stream is produced by a centrifugal fan with a spiral housing and an impeller of suitable dimensions and rotational speed. Said rotational speed is of course selectively adjustable by the device operator, while the aforementioned minimum value of 300 km/h (83.3 m/s) with respect to the maximum velocity of the spray jet refers to the velocity measured at the centre of the device's outlet, when the impeller rotates at maximum speed. The high velocity of the air stream does not only ensure an effective dispersal of the liquid into droplets but also an adequate fire extinguishing range for the spray jet, even in adverse weather conditions, such as strong winds blowing against it. For an even longer range, the maximum velocity of the air stream is preferably at least 400 km/h (111.1 m/s).

A funnel of gradually reduced cross section may be fitted to the spiral housing outlet in order to accelerate the flow and ensure even better results. Furthermore, a duct of constant cross section may be inserted between the spiral housing outlet and the funnel and/or fitted downstream of the funnel to straighten the flow and impart the desired direction to it.

Background Art

Compared to the spray jet of the present invention, water ejected from hoses of fire engines or dropped from aerial fire-fighting means into the fire is at a high concentration, i.e. its quantity is large in relation to the size of the area covered. Thus, most of the water penetrates the core of the fire and lands on the ground without exercising any extinguishing action and is therefore wasted.

Besides, in case of forest conflagrations another problem arises from water hitting the ground with force: The water churns the soil and is mixed therewith, forming mud. Mud dried by the high temperature of the fire forms a surface crust under which in certain areas there are e.g. leaves smoldering amid stones, enough air being present in the gaps therebetween to maintain combustion (kiln-like conditions). These small and hidden embers are often the cause of fire rekindles.

The following documents belong to the state of the art, among others:

- U.S. Pat. No. 5,980,059 (Chi), which relates to a portable smoke dispersing device for fires, especially in closed places, so that firemen can enter quickly and save people who are trapped therein and are in danger. By the figures of the document alone, it is evident that the device is of a small size, suspended from the operator's shoulder by a simple strap, and has a small axial fan. The document is silent about the outflowing air velocity, whose magnitude is an essential feature of the present invention. Moreover, although the document's device can spray water into the discharged air stream, "the minute water drops . . . can be blown by the strong wind towards dense smoke from a fire, not only lowering temperature of the fire, but also condensing miscellaneous matters in the smoke to lessen the dense smoke (see column 2, lines 9-13). Again nothing is mentioned about putting out, a fire, which the device of U.S. Pat. No. 5,980,059 obviously cannot achieve, judging by the very small size of the water container in the figures. This device was designed to solve a different technical problem (dispersing dense fire smoke).
- U.S. Pat. No. 6,446,731 (Sorosky), which relates to a device for removing smoke and gases from closed spaces which are on fire, said device being mounted on self-propelled fire-fighting vehicles. The aim of the invention is to minimise damage to property caused by smoke, to reduce the risk of personal injury to both firefighters and occupants of the burning structure and to slow down spreading of the fire (column 1, lines 14-20). It comprises a tube which can be extended and retracted (telescopic) and includes mechanical means for training the tube laterally, as with a rotary turret, and means for elevating and depressing the tube above and below the horizontal plane (column 2, lines 48-54). An axial fan rotates inside the tube to create vacuum and cause aspiration of the smoke out of the burning room. By reversing the flow of the fan after the smoke has been evacuated, firefighting materials such as water or chemicals can be blown into the fire site to extinguish the fire (column 2, lines 39-42 and 60-64 and column 5, lines 3-11). This document is also silent about the outflowing air velocity. However, the skilled person can easily understand that this device is operated at much lower air velocities, solely by the fact that a tube of significant length is required, so that its end may approach the fire to achieve aspiration of the smoke from the closed space and putting out of the fire thereafter. Therefore the device of U.S. Pat. No. 6,446,731 aims mainly to solve a different technical problem (smoke aspiration), whereas it also has a very narrow range of applications as far as fire extinguishing is concerned (closed spaces).

In contrast, the device of the present invention operates at high air velocities, produced by a centrifugal fan in order to create a spray jet of long range, so that firemen will be able to put out a fire from a safe distance, even if it breaks out in open spaces and extends in a wide area (e.g. forest conflagration).

GR1007732 (Krekoukis), which relates to a fire extinguishing device comprising a fan for creating a powerful air stream of high velocity and a funnel guiding the air flow in the desired direction, said funnel being coaxial with the fan impeller, its cross section being reduced from its inlet to its outlet. It is evident that this document represents the closest prior art, however the disclosed device still has substantial differences from the present invention. In particular, as shown in the figures and as can be deduced by the fact that the air flow guiding funnel is coaxial with the fan impeller, the fan is of an axial type. Besides, although GR1007732 speaks of a "high velocity air stream", it remains silent as to the magnitude of said velocity. Prototypes of the device of GR1007732 which were tested did not achieve adequately high air velocities and the outgoing flow was quite turbulent because of the twirling motion imparted to the air by the impeller. As a result, neither good control of the jet's direction nor a long jet range was attained.

A substantial improvement to the device of GR1007732 is realised by the present invention, by replacing the axial fan with a centrifugal fan having a spiral housing. Centrifugal fans are better suited for applications not just of greater air flow rate (and therefore of higher air velocity) but also of higher static pressure compared to axial fans, which means that the air jet is capable of overcoming adverse weather conditions, e.g. strong winds blowing against it. A centrifugal fan generally adds more energy per mass unit to the air flowing therethrough, it has a higher efficiency and the flow coming out of the spiral housing is more laminar. It therefore produces a highly directional jet beam of a range long enough to put out a fire, while the firemen-device operators are at a safe distance therefrom.

In GR1007732 the air stream itself was reported as the fire extinguishing medium. Spraying water or another liquid fire extinguishing medium (claims 12, 15) was "optional". Hence the device was standalone, in the sense that it did not need any source e.g. of water to perform its fire extinguishing function. However, tests showed a significant difference in the effectiveness of the device in the presence and in the absence of water. Therefore the device of the present invention is related to a spray jet and not just to a plain air stream.

Finally, as in GR1007732, the fire extinguishing device in the present application may be portable, mounted on a land vehicle (it can even be retrofitted to existing fire engines) or even airborne, e.g. suspended from a helicopter. Each of these embodiments of the device has been redesigned in the present application, to include substantial improvements and overcome individual technical problems. The common denominator of all the embodiments, imparting unity to the invention, is of course the centrifugal fan with the spiral housing and the high velocity of the outgoing air stream, and consequently of the discharged spray jet, achieved thereby. For each embodiment, a suitable support for mounting the fan with the spiral housing, the motor and the other parts of the device has been designed.

Hereafter are described certain exemplary and non-limiting embodiments of the invention by reference to the attached figures. It should be noted that wherever in the application terms expressing a relative position or direction are met, such as "front", "back"/"rear"/"behind", "left", "right", "up"/"upwards", "down"/"downwards"/"under"/"underneath", these are to be construed either in relation to the position the device operator assumes during its manipulation, or in relation to the direction of the discharged spray jet when it comes to remotely controlled versions of the device.

BRIEF DESCRIPTION OF DRAWINGS

FIG. 4 shows the device in a position for transport (reclined).

FIGS. 5a and 5b depict the device with two different types of impeller (the right side of the spiral housing having been removed).

FIG. 6 shows a manually operated version of the device for mounting on a land vehicle, in a use position (upright), in perspective view, from the right back side.

FIG. 20 illustrates a detail of FIG. 19, showing the mechanism for locking the mounting support to the vest and releasing it therefrom.

FIG. 21 shows another embodiment of the portable device with a different fan arrangement, in perspective view, from the right back side.

MODES FOR CARRYING OUT THE INVENTION

Figure 13:
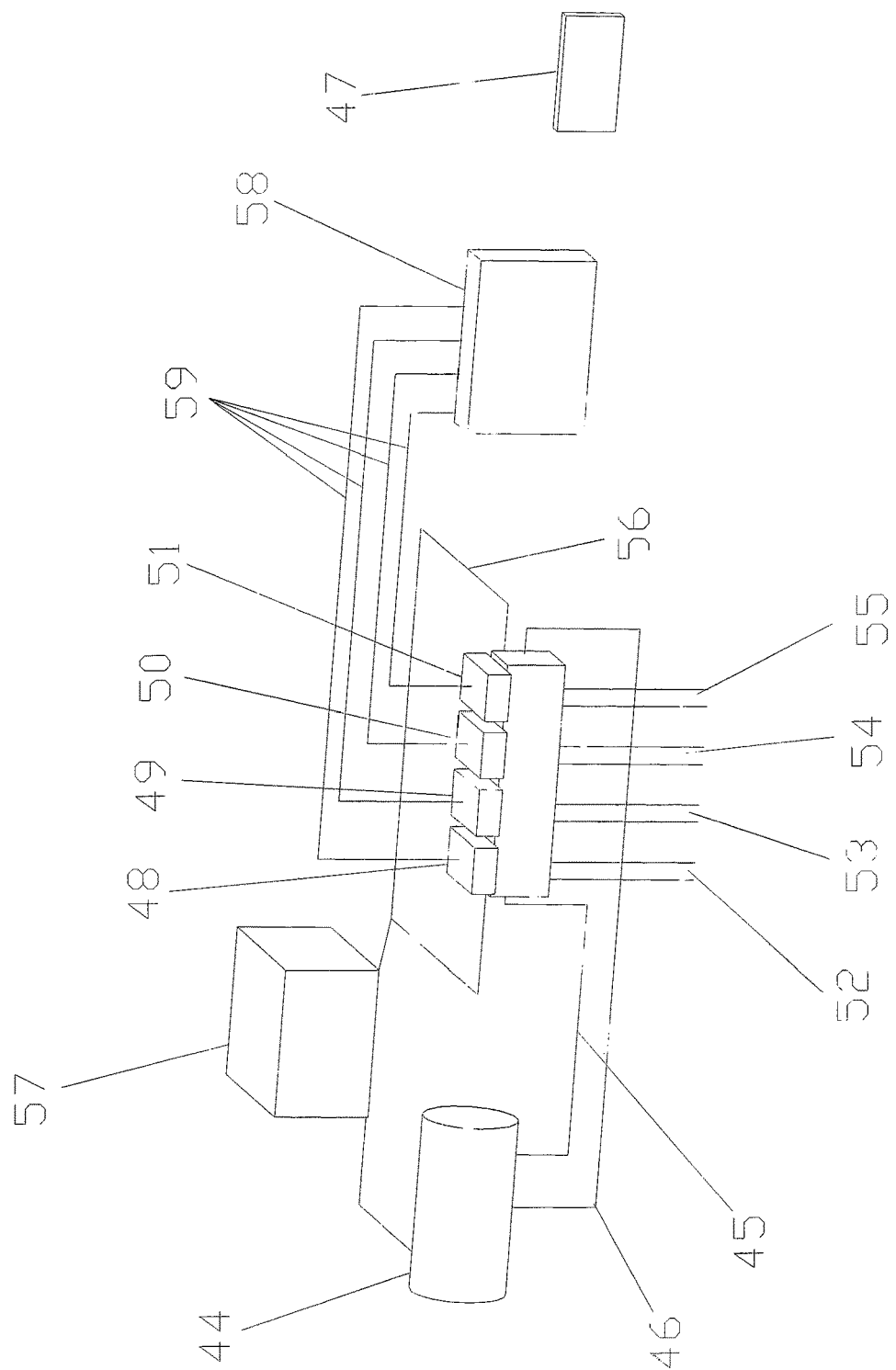
FIG. 13 illustrates the main parts of the hydraulic circuit and the electronic control circuit of the remotely controlled version of the device.

In the remotely controlled version (10) of the device (FIGS. 1-4) which is to be mounted on a land vehicle, either self-propelled or towed, all the required motions—impeller rotation, rotation of spiral housing around a vertical axis (left-right rotation) and around a horizontal axis (change of inclination, up-down), reclining of housing for transport—are effected via hydraulic motors and cylinders. Part of the hydraulic and electric circuits, which may be located in another part of the vehicle, even remote from the device, is shown in FIG. 13.

The hydraulic circuits are preferably supplied with oil by a double pump arrangement (44), consisting of two fluidly independent pumps, with separate inlets and outlets, mounted on a common shaft so that they are driven by the same motor, e.g. the vehicle's diesel engine. The hydraulic circuit (45) which rotatively drives the hydraulic motor (2), said motor in turn driving the impeller of the centrifugal fan with the spiral housing (1) is separate, i.e. it is fed by one of the two pumps (specifically the one which produces the highest pressure difference), so that no fluctuations in the rotational speed of said motor (2) and consequently of the impeller occur when other hydraulic parts are activated or deactivated. Hydraulic motor (2) is supported at a point of the spiral housing's (1) circumference, its shaft (3) being parallel to the impeller shaft (4). Each shaft is mounted within its own hub (5) via bearings, the impeller shaft (4) being driven by the motor shaft (3) via a multiple V-ribbed belt (7) running on multi-groove pulleys (6). The belt-pulley transmission is covered by a protective cover (8), to eliminate the risk of any person getting injured or of objects getting caught, causing damage to the device or being damaged themselves. Of course the hydraulic motor-to-impeller transmission may be implemented in other ways, known in the art, such as a chain-and-sprocket drive or a direct coupling of their shafts.

Air suction is effected through the spiral housing (1) centre, which is covered by a protective mesh (9) to inhibit entrainment of debris therein. The impeller imparting energy to the air may be of different types and sizes, its selection depending on the motor power, on the desirable characteristics of the discharged spray jet beam and on cost. Thus, the impeller may have four or more blades, which may be straight, forward- or backward-curved (fans with backward-curved blades have higher efficiency). Furthermore, in case there is no particular restriction with regard to the spiral housing (1) width, the impeller may be multi-stage, i.e. there may be more than one impellers mounted on a common shaft, the housing being shaped internally so that air coming out of one impeller flows into the next and higher pressures are produced. In FIGS. 5a and 5b, where the right side of the spiral housing (1) has been removed to make its interior visible, the impeller has six straight blades of variable height (their height increases linearly from the centre towards the periphery until about the middle of the impeller radius and thereafter remains constant). The difference between the two figures lies in that the impeller in FIG. 5a is semi-closed (11), i.e. it has a circular plate attached on one side of the blades, whereas in FIG. 5b it is closed (12), i.e. both sides of the blades are covered by plates (one of the plates having a sizeable aperture, of course, for the air to be drawn therethrough).

A funnel (13) of gradually reduced cross section is fitted to the spiral housing (1) outlet, causing acceleration of the air flow. It is connected to a cylindrical duct-outlet (14), so that the outgoing air stream is straightened. Since the spiral housing (1) outlet is of square cross section, the funnel (13) is itself a square-to-round reducer. In case there are obstacles in the line of the discharged spray jet to the fire, which cannot be circumvented by turning the device to the left or to the right or by changing its inclination (up-down), a flexible duct (15) may be fitted to the device outlet, it being possible via said duct to direct the spray jet to the desired point while avoiding said obstacles.

To produce the spray, hydraulic piping is provided near the spiral housing (1) outlet, a part of it being outside the housing and ending at a fitting connection (16) to a source of water or other liquid fire extinguishing medium (e.g. a quick coupler), its other part being within the housing and having one or more spray nozzles (17). To the fitting connection (16) may be connected either an "external" liquid supply hose, i.e. a hose lying completely outside the device, or an "internal" liquid supply hose (18), part of which passes through the central, rotatable support pillar (19) of the device, as will be described below, so as to be able to follow the device throughout its whole range of motions without running the risk of excessive twisting.

The form of the spray (droplet size, jet beam velocity and range) depends on two parameters, which may be adjusted as desired by the device operator: the liquid flow rate, which is adjustable via a valve in the hydraulic circuit supplying liquid to the spray nozzles (17), and the air flow rate, which is determined by the rotational speed of the fan impeller. To adjust the latter, the operator instructs via a wired or wireless remote control (47) the control panel (58) to open or close the electrovalve (48) of the hydraulic circuit (52) supplying hydraulic motor (2) with oil, thus regulating said motor's rotational speed and consequently that of the impeller. Alternatively, electrovalve (48) may be omitted, the control of the hydraulic motor's (2) rotational speed being effected by varying the revolutions of the engine driving the double oil pump (44) via a suitable actuator, which is again instructed via the remote control (47).

To change the inclination of the spray jet beam in the vertical plane (up-down), the lateral surfaces of the spiral housing (1) close to its circumference are pivotally connected to a U-shaped upper base (20). The pivot points (21), (22) are located on the two arms of the "U" and define an imaginable horizontal axis around which the spiral housing (1) may rotate, thereby changing the inclination of the outlet duct [housing (1) outlet—funnel (13)—cylindrical duct (14)]. Rotation is effected by the action of a hydraulic cylinder (23) whose one end is pivotally connected to one of the arms of the "U", its other end being pivotally connected to the respective lateral surface of the spiral housing (1). In the arrangement shown in FIG. 2, where both ends of the hydraulic cylinder (23) are behind the vertical plane in which lies the imaginable horizontal axis of rotation of the housing (1), when the cylinder rod is extended the outlet duct is lowered, whereas when the rod is retracted the outlet duct is raised. Cylinder (23) is supplied with oil by hydraulic circuit (54) and its movement is controlled by electrovalve (50), which is again instructed via the remote control (47). To prevent twisting of the hoses (24) supplying oil to the hydraulic motor (2) driving the impeller during the movement of the device in a vertical plane (up-down), said hoses have rotary couplings (25) near their connection points to the motor (2).

Underneath the horizontal plate of the U-shaped upper base (20) there is a second, rectangular plate-lower base (26), which is pivotally connected to the upper base (20) via one or more hinges (27), along one edge which is perpendicular to a plane parallel to the "U"-shape of the upper base. The upper base (20) may therefore swivel with respect to the lower base (26) and be lifted, thus causing the spiral housing (1) to recline in a position for transport (in the arrangement of FIG. 4, reclining takes place to the right). Reclining with the help of "double" base (20), (26) serves in the transport of the device when it is mounted on the roof of a fire engine, because this way only a small increase of the vehicle height occurs, still allowing it to pass through openings of limited height, e.g. under bridges (see FIGS. 9, 10). Furthermore, the vehicle's stability is not adversely affected. Reclining is effected via a hydraulic cylinder (28), whose one end is pivotally connected to the rotatable jacket (29) of the support pillar (19)—which will be described in detail below—its other end being pivotally connected to the arm of the U-shaped upper base (20) which is on the same side as the hinge(s) (27). Thus, cylinder (28) follows the motion of the device as it turns to the left or to the right. When the cylinder rod is retracted the upper base (20) swivels away from the lower base (26) and the spiral housing (1) is reclined in a position for transport. When, on the other hand, the cylinder rod is extended, the upper base (20) swivels again about hinge(s) (27) and sits on the lower base, the spiral housing (1) coming back to an upright position, the device being thus ready for use.

Cylinder (28) is supplied with oil by hydraulic circuit (53) and movement of its rod is controlled via electrovalve (49). Alternatively and in order to reduce manufacturing costs, the two hydraulic circuits (53), (54), of the cylinder (28) for reclining the device and of the cylinder (23) for changing the inclination angle of the spray jet beam in the vertical plane respectively, may be merged into one and the electrovalve (49) which controls reclining of the device may be dispensed with. In this case the cylinder (28) for reclining the device is supplied with oil via two hoses which branch off the supply and return hoses of hydraulic circuit (54) and are provided with two manual valves (30). When the device is in a position for transport and it is desired to bring it to a use position, valves (30) are opened, whereby electrovalve (50) supplies with oil both the cylinder (28) for reclining the device, which lifts the spiral housing (1) to an upright position, and the cylinder (23), which simultaneously rotates the housing (1) around the axis defined by the pivot points (21), (22). The second motion may be superfluous but does not affect the first, desired motion. Thereafter manual valves (30) are closed and cylinder (28), which is not required during use of the device, is isolated. Electrovalve (50) now only controls hydraulic cylinder (23), i.e. the inclination of the spray jet beam in the vertical plane. Once use of the device has been completed, it is brought back to its position for transport by opening manual valves (30) and giving an instruction to electrovalve (50) to supply oil for a very brief period, in order to initiate retraction of hydraulic cylinder (28). Thus a small inclination is imparted to the spiral housing (1) and further retraction of cylinder (28) takes place without any other action required from the operator, under the effect of the weight of the housing and of other parts of the device, until said device is fully reclined.

Rotation of the device in the horizontal plane (left-right), with any number of complete turns in the same direction (continuous circular sweeping) being possible, is effected via a central, rotatable support pillar (19). In a conventional support arrangement which allows for rotation around a vertical axis the pillar is fixed and hollow, a shaft carrying the rotating parts being rotatively mounted within the pillar's cavity via bearings. In the case of the present invention, where there are several oil supply and return hoses to and from hydraulic motors and cylinders, such a support arrangement would not allow wide angles of rotation of the device, since the hoses would be twisted and pulled excessively or get tangled, given that their connection points to other parts of the hydraulic circuits are fixed.

Therefore support pillar (19) has a reverse configuration, i.e. it has a fixed internal trunk, which functions as a central oil distributor (31) to the various hydraulic parts (motors, cylinders) the device is equipped with, and a rotatable external jacket (29) with radially oriented through holes (32) having connectors for connecting oil hoses leading to said hydraulic parts. The rotatable jacket (29) is attached to the lower base (26). Therefore, when the jacket (29) rotates, the upper (20) and lower (26) base, the spiral housing (1) and the hydraulic parts (motors and cylinders) all rotate along with it, their motions being followed by the oil hoses supplying said hydraulic parts with oil, without any twisting of said hoses taking place.

More specifically, the support pillar (19) has a fixed base (33) which is bolted to the mounting surface of the device. A gear wheel (34) is fixedly connected to the base (33), its symmetry axis being vertical. The central oil distributor (31) is also fastened to the base (33), via a retaining ring (35). The external jacket (29) surrounds the distributor (31) and may rotate around it via two bearings, upper (36) and lower (37). Rotation of jacket (29) is effected via a hydraulic motor (38), which is mounted on the jacket itself having its driveshaft vertically oriented, said driveshaft carrying a pinion (39) which engages with the big, fixed gear wheel (34) of the base (33). Thus, when the driveshaft of hydraulic motor (38) rotates, pinion (39) rolls on the toothing of fixed gear wheel (34), resulting in that the motor (38) itself revolves about the central axis of the support pillar (19) and at the same time entrains the external jacket (29) into rotation around same axis. Motor (38) is supplied with oil from a hydraulic circuit (55), the speed and direction of rotation of its driveshaft, and consequently of the whole device, being controlled via an electrovalve (51).

Both the fixed support base (33) and the fixed gear wheel (34) have centrally located apertures, so that oil supply and return hoses/pipes of the aforementioned hydraulic circuits (52), (53), (54) and (55) coming from electrovalves (48), (49), (50) and (51) may pass therethrough and connect to orifices (40) at the bottom of the central oil distributor (31) via suitable connectors. The distributor (31) is generally in the form of a vertically disposed cylinder. The orifices (40) at its bottom are the inlets to axial channels extending within the cylinder, each to a different length, then curving to extend radially outwards and let out at the bottom of circular grooves (41) located on the cylinder circumference (said grooves being oriented so that their "bottoms" are substantially parallel to the vertical axis). The internal wall of the rotatable jacket (29) in conjunction with the grooves (41) of the cylindrical distributor and with seals (42) provided at the lateral walls of grooves (41) define separate, leakproof annular oil chambers. Adjacent oil chambers are separated and sealed with respect to each other via a single seal (42). The external jacket (29) of the support pillar (19) has a radial through hole (32) opposite each groove (41), said through hole having, as already mentioned, a connector for connecting an oil hose leading to one of the hydraulic motors (2), (38) or cylinders (23), (28). The presence of the annular chambers on the central distributor (31) ensures an uninterrupted oil supply to these hydraulic parts, regardless of the rotation angle of the device to the left or to the right. It is obvious that two grooves (41) on the central distributor (31), i.e. two annular oil chambers, correspond to each of the hydraulic circuits (52), (53), (54), (55), one for the supply and one for the return line.

It should be noted that the distributor's (31) cylinder may have an axial through hole at its centre and the upper (20) and lower (26) base may have corresponding through holes, so that the aforementioned "internal" hose (18) supplying water or other liquid fire extinguishing medium may pass therethrough. Alternatively, the axial through hole of the distributor (31) may constitute itself part of the internal hose or pipe (18). In any case, the hose/pipe (18) has a rotary coupling (43) at a suitable point of its vertical route, so as to be able to follow the motion of the device to the left or to the right without being twisted.

A retaining ring (142) is fastened on top of the central oil distributor (31), forming a shoulder for the internal ring of the jacket's (29) upper bearing (36), which inhibits dislodgement of said bearing in an upward direction. Since the external ring of bearing (36) and the rotatable jacket (29) have a tight fit, the retaining ring (142) also prevents any undesired upward movement of jacket (29) under the effect of oil pressures developed within the central support pillar (19).

As mentioned above, the hydraulic circuit (45) which includes one of the two pumps of the double oil pump (44), namely the one producing higher static pressure, supplies with oil the circuit (52) of hydraulic motor (2) which drives the centrifugal fan impeller. The circuit (46) of the second pump, i.e. the one producing lower pressure, supplies all the other hydraulic circuits (53), (54), (55) of the cylinder (28) for reclining the device, the cylinder (23) for changing the inclination angle of the spray jet beam in the vertical plane and the motor (38) for turning the device to the left or to the right, respectively. All the return lines merge into a common return circuit (56) which ends in a common oil return tank (57). Finally, as shown in FIG. 13, the central control panel (58) is instructed via remote control (47) and controls electrovalves (48), (49), (50) and (51) via low voltage circuitry (59).

In the manually operated version (60) of the device for mounting on a land vehicle, which is depicted in FIG. 6, hydraulic cylinders (28), (23) and motor (38) for turning the device to the left or to the right have been dispensed with, together with their respective hydraulic circuits. Only hydraulic motor (2) which drives the centrifugal impeller fan remains, the electrovalve (48) having been removed from its hydraulic circuit, and oil is no longer supplied by a double pump (44) arrangement but by a single pump. Remote control (47) has been replaced by a control (61) located on the spiral housing (1), the hoses (24) supplying oil to the motor (2) passing through said control, which also has a manometer (62) and a lever or other suitable means (63) for adjusting the oil flow rate and thereby the rotational speed of the impeller and the velocity of the discharged spray jet.

Due to the presence of a single hydraulic motor (2), only two annular oil chambers are required in the central support pillar (19), which means that the central oil distributor (31) has only two grooves (41) and the rotatable external jacket (29) has two radial through holes (32).

Bringing the device from the upright position (use position) of FIG. 6 to the reclined position for transport (as in FIG. 4) and vice versa is done manually. The device may be secured in an upright position by locking the upper base (20) and the lower base (26) together via a latch (64) when the first base sits on top of the second base. Thus, the device may be used without the risk that the spiral housing (1) will be overturned to the side.

The pair of gears (34), (39) is no longer being used to rotate the device to the left or to the right. A U-shaped handle (65) is pivotally connected to the back side of the spiral housing (1), with a locking mechanism (66) of its pivot points at the desired angle, so that the position of the handle (65) may be suitably adjusted according to the operator's height. The exertion of a force on the handle (65) by the operator towards the left or the right causes a collective rotation in the opposite direction of the spiral housing (1), the pair of bases (20), (26) and the jacket (29), which is fastened to the lower base (26) and mounted on bearings (30), (34).

It should be underlined that the arms of the "U" of the upper base (20) are longer in the manually operated version (FIG. 6) of the device (60) and that the pivot points (21), (22) which define the imaginable horizontal axis around which the spiral housing (1) rotates to adjust the inclination of the spray jet beam in the vertical plane (up-down) have been moved backwards and upwards on the housing (1) compared to the remotely controlled version (FIGS. 1, 2) of the device (10). The reason for this is that, due to the conservation of momentum principle, the high velocity of the discharged spray jet beam results into movement of the housing (1) at a high speed in the opposite direction (anticlockwise in the view of FIG. 6), which the operator is obliged to restrain. Altering the position of the pivot points (21), (22) leads to containment of the aforementioned "recoil", because the weight of the device generates a moment in the opposite direction (clockwise in FIG. 6). Thus the operator needs only exert a small force on the handle (65) in order to raise or lower the spray jet beam. Once the use of the device has been completed, the operator lets the spiral housing (1) pivot downwards slowly and rest gently on the resilient supports (69) which are fastened to the upper base (20).

In order to facilitate the assembly of the device, one arm of the "U"—the left one (68) in FIG. 6—is removable. Moreover, the initial part of the oil supply and return lines starting from the through holes (32) of the jacket (29) is rigid and arranged mainly in a horizontal direction, so that the elastic hoses (24) which are connected to the ends of the rigid pipes (70) start at an adequate distance from the support pillar (19) and that the additional length of said hoses which is required in order for the device to be able to cover a wide range of inclination angles of the spray jet beam (up-down) is not enough for the hoses to touch the "ground" (i.e. the vehicle surface the device is mounted on) and be dragged upon it with the risk of getting tangled somewhere.

Figure 9:
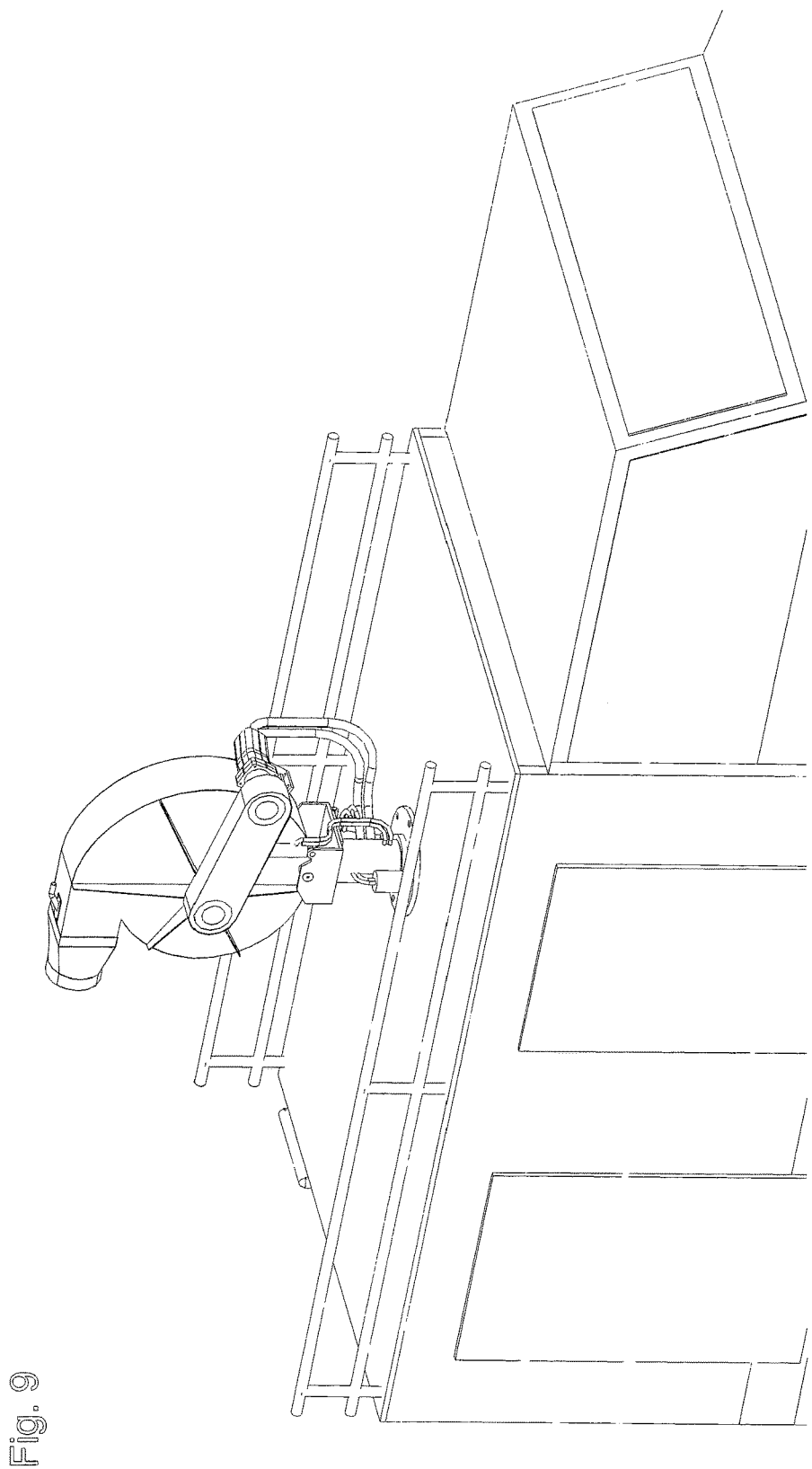
FIG. 9 shows the remotely controlled version of the device of FIGS. 1-4, in a use position (upright), mounted on the roof of a vehicle.
Figure 10:
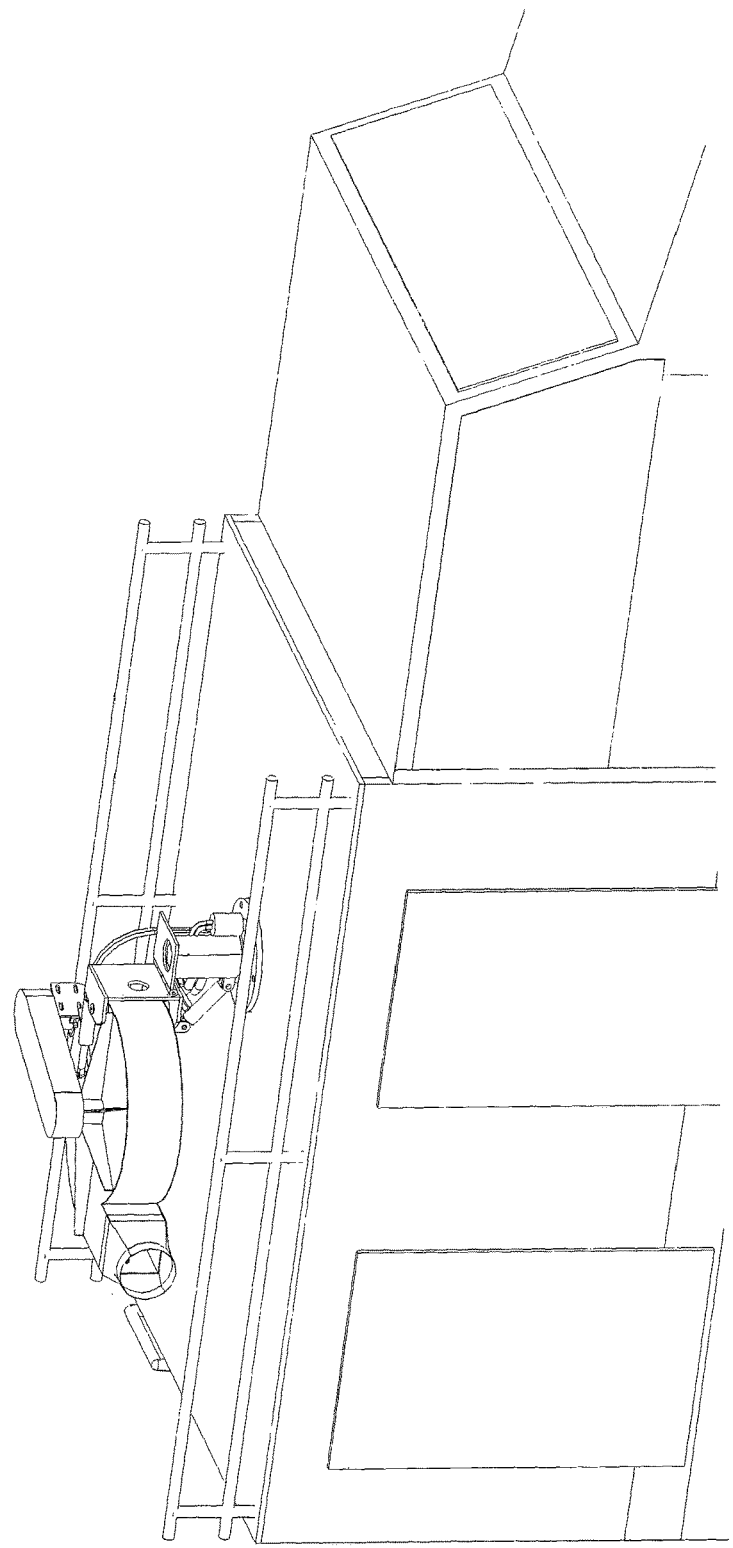
FIG. 10 shows the device of FIG. 9 in a position for transport (reclined).

Last but not least, the manually operated version of the device (60) may obviously be mounted on the roof of a land vehicle, e.g. a fire engine, as shown in FIGS. 9 and 10.

The differences between the remotely controlled (10) and the manually operated (60) versions of the device of the present application compared to the device depicted in FIGS. 4-7 of patent GR1007732 are so many and so clear that the aforementioned remark about redesigning the device is perfectly justified. Apart from the adoption of the centrifugal fan with the spiral housing (1), the new device is superior to the old one for other reasons, the following being mentioned by way of example:

Designing the central oil distributor (31) and the external rotatable jacket (29) so that annular oil chambers are formed within the central support pillar (19) gives the device the ability to rotate in full circles in the same direction (continuous circular sweeping). Rotation of the device to the left or to the right is performed freely, without any risk of twisting, pulling or tangling of the hoses supplying oil to the hydraulic parts (motors and/or cylinders) which it carries or of the hose supplying water or other fire extinguishing medium to the spray nozzles (17). This is a technical problem which had not even been discussed in GR1007732.

The new device may be reclined to its position for transport quickly and easily. The big funnel of the axial fan, which had to be removed before reclining the old device and then disassembled in two halves in order to take up less space, is no longer present. Furthermore, in the remotely controlled version (10) of the device reclining is effected via a hydraulic cylinder (28), whose motion is controlled by the remote control (47).

In order to mount the device at the front or the rear part of a land vehicle, the support arrangements which have been described above, either for the remotely controlled (10) (FIGS. 1, 2) or for the manually operated (60) (FIG. 6) version of the device, may be employed, provided that an extension for mounting the central support pillar (19) upon is fastened to the vehicle. In this case the reclining feature of the spiral housing (1) is of course redundant, hence the lower base (26) and the one or more hinges (27) may be omitted and the rotatable jacket (29) may be attached directly to the U-shaped base (20). Likewise, the cylinder (28) for reclining the device and its respective hydraulic circuit (53) may be omitted from the remotely controlled version (10) of the device. In spite of these simplifications to the device, the aforementioned mounting arrangement, wherein the base (20) and the pillar (19) are located substantially centrally under the spiral housing, has the disadvantage that the extension for mounting the device upon must project to a substantial extent, so that the support pillar (19) is at an adequate distance from the front or rear part of the vehicle to allow free rotation of the device to the left or to the right during its use. Besides, there is no reason for the device to be capable of describing a full circle (a 360° angle) when it is mounted at the front or rear part of the vehicle, since the vehicle itself would obstruct the discharge of the spray jet beam in its direction.

Figure 7:
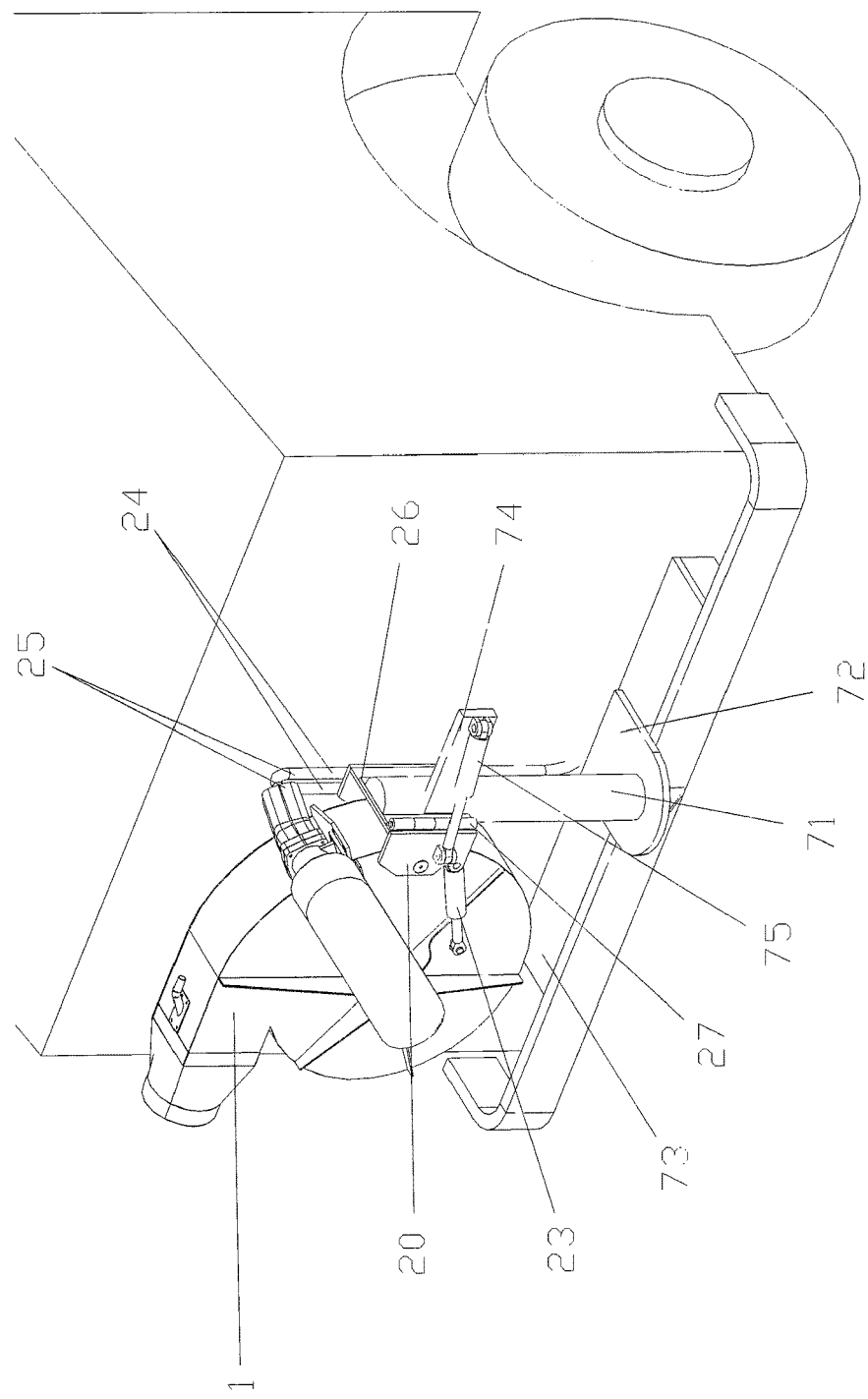
FIG. 7 illustrates another embodiment of the remotely controlled version of the device, mounted at the front of the vehicle.

Therefore, FIG. 7 illustrates a modified version of the device, suitable for mounting at the front or rear part of the vehicle (here shown mounted at the front). The main modification is that the two bases of the spiral housing (1), i.e. the U-shaped base (20) and the fixed plate-base (26), are now arranged vertically (i.e. the plane which is parallel to the "U"-shape of base (20) is now horizontal) and located behind the housing instead of being under it, the axis (axes) of the hinge(s) (27) connecting said bases now being vertical, not horizontal. The device support pillar (71) bearing the fixed plate-base (26) is a fixed, simple pillar without a central oil distributor and a rotatable external jacket. The extension (72) upon which the whole device is mounted projects slightly from the front of the vehicle and is shown fastened to its bumper (73).

Figure 8:
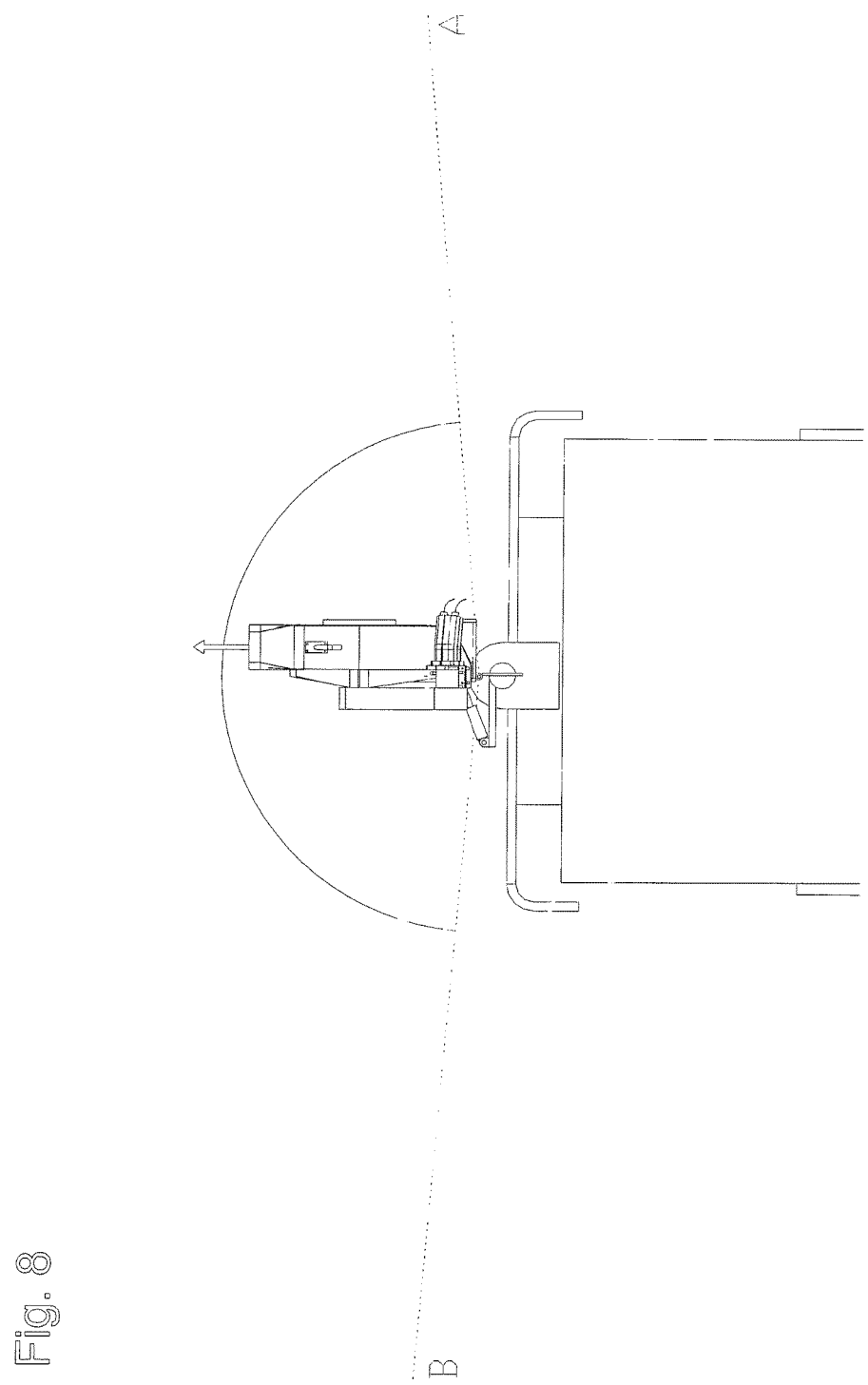
FIG. 8 shows in plan view the range of motions in the horizontal plane of the embodiment of FIG. 7.

The support pillar (71) has a bracket (74) extending perpendicularly thereto, one end of a hydraulic cylinder (75) being pivotally connected to said bracket, its other end being also pivotally connected to the U-arm of base (20) being on the same side as the hinge(s) (27). Thus, in the configuration of FIG. 7, when the cylinder rod is retracted, base (20) moves away from the fixed plate-base (26) swiveling about the hinge(s) (27), and the spiral housing (1) turns to the left, whereas when the rod is extended, the housing (1) turns to the right. In this way the device can cover a rotation angle of about 180° (see FIG. 8). In FIG. 7 the housing (1) is shown at its far right position, which is suitable for transport of the device, since in this position the device projects the least from the vehicle.

The hydraulic cylinder (75) has actually taken the place of the hydraulic motor (38) used with the other aforementioned embodiments of the invention, since rotation of the device to the left or to the right is now effected via said cylinder. Both the cylinder (23) for changing the inclination angle of the spray jet beam in the vertical plane and the hydraulic motor (2) driving the impeller remain. Rotary couplings (25) are used to protect the hoses (24) supplying oil to the motor (2) from excessive twist.

Figure 11:
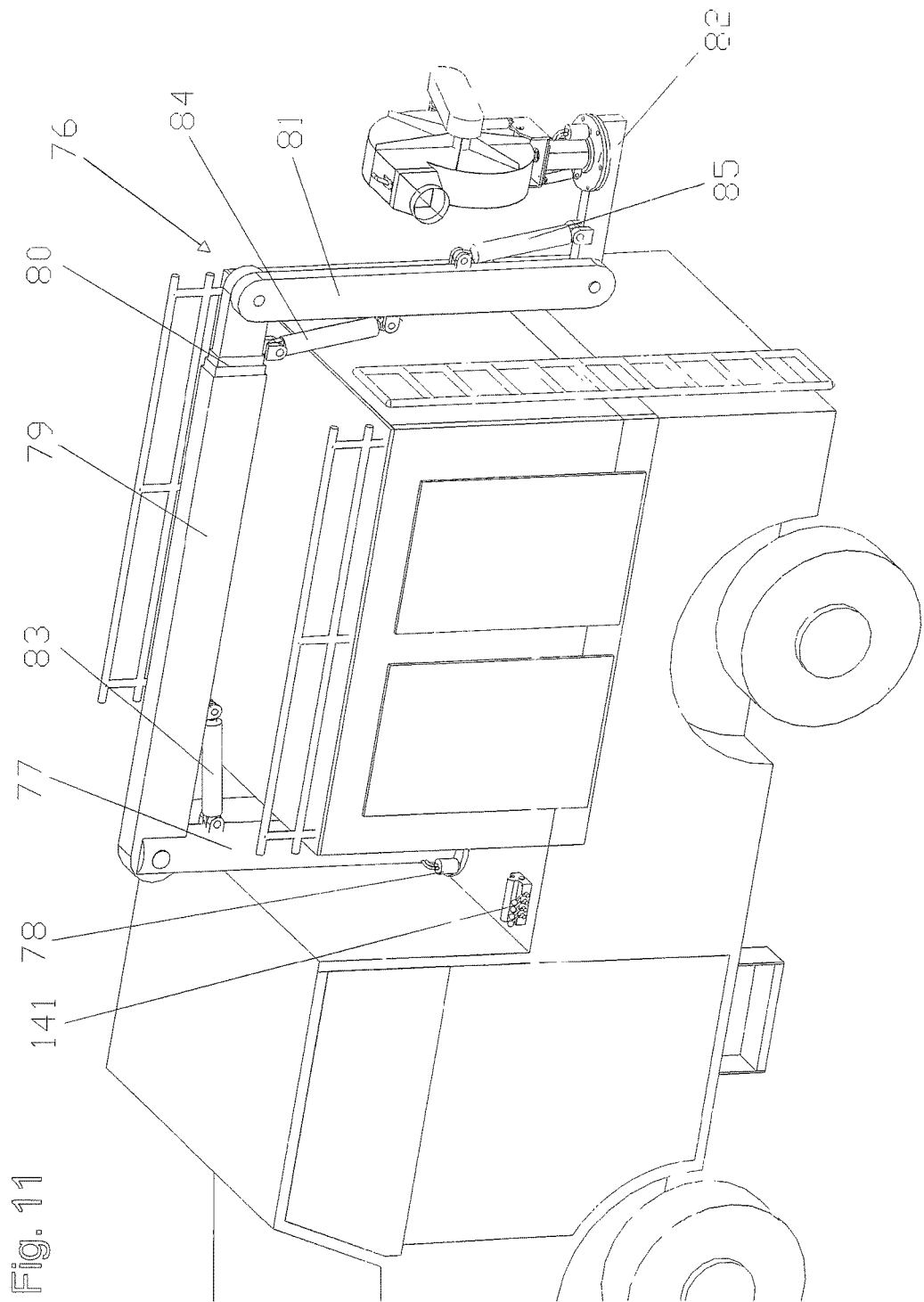
FIG. 11 shows the remotely controlled version of the device of FIGS. 1-4, adapted to the end of an articulated arm mounted on a vehicle, in a position for transport.
Figure 12:
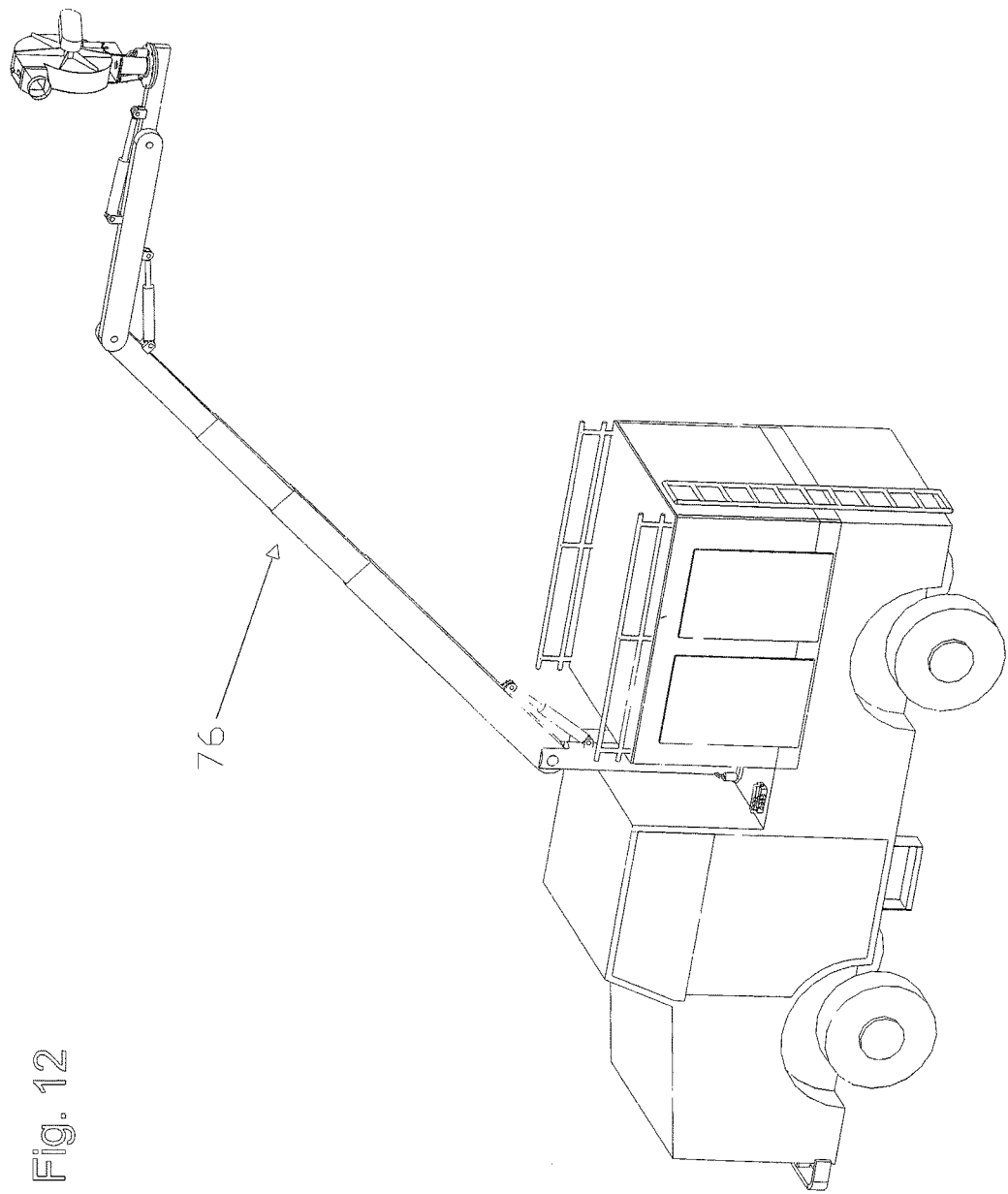
FIG. 12 shows the device of FIG. 11 in a use position, with the arm extended.

FIG. 11 shows the remotely controlled version (10) of the device (FIGS. 1, 2) mounted on one end of an articulated arm (76) fitted to a land vehicle. This embodiment aims at tackling fires in tall buildings, raising the device above obstacles and generally at increasing the operating height and range of the device. The arm (76) shown in the figure consists of four parts, this feature not being mandatory of course: the turret (77), which is rotatable around a vertical axis via a hydraulic motor (78), the telescopic member (79) whose length is adjustable via sliding, nested extensions (80), the intermediate member (81) and the distal member (82), on which is mounted the device. Each of the three last parts is pivotally connected to its preceding part and is rotatable in a vertical plane with respect to said preceding part via a hydraulic cylinder (83), (84) or (85). Cylinders (83) and (84) serve the purpose of lifting the telescopic member (79) and the intermediate member (81) respectively, and cylinder (85) serves at leveling the distal member (82) and the device. All the motions of the articulated arm are controlled via a control panel (141) located on the vehicle or, alternatively, via a remote control.

Figure 14:
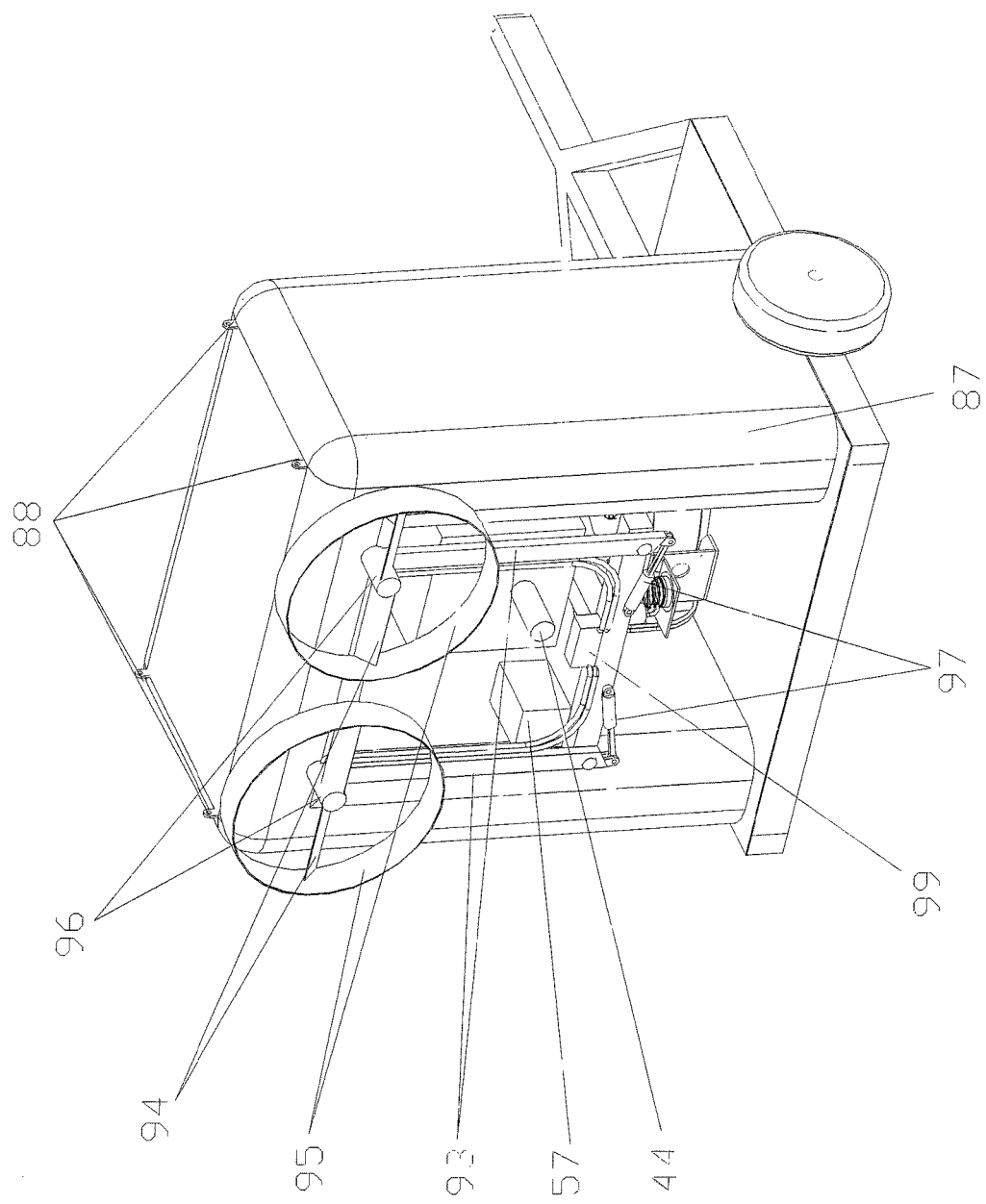
FIG. 14 depicts the version of the device for aerial fire-fighting operations in a position for transport by a trailer, in perspective view, from the right back side.
Figure 15:
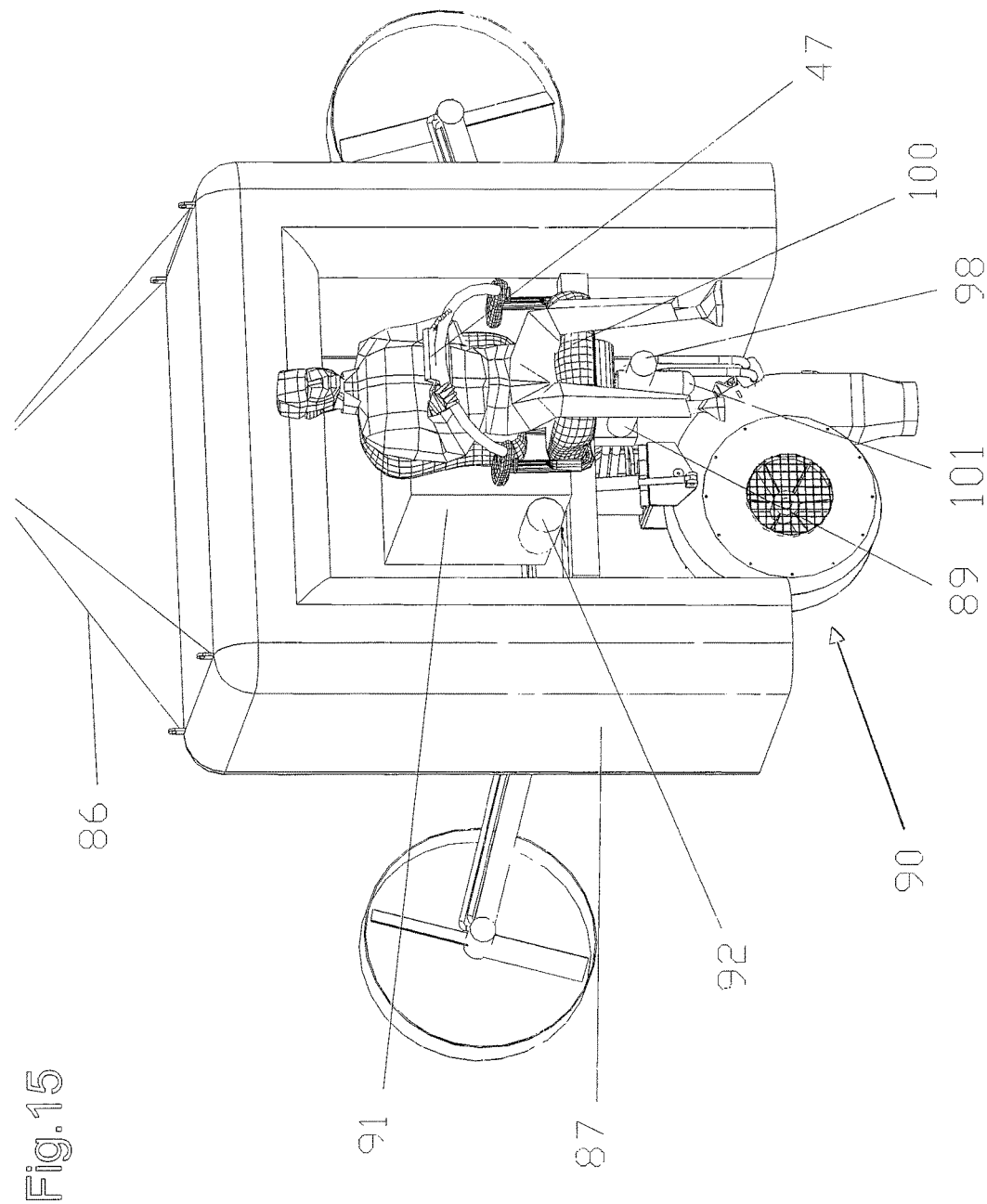
FIG. 15 shows the same device airborne, in perspective view, from the front right side.
Figure 16:
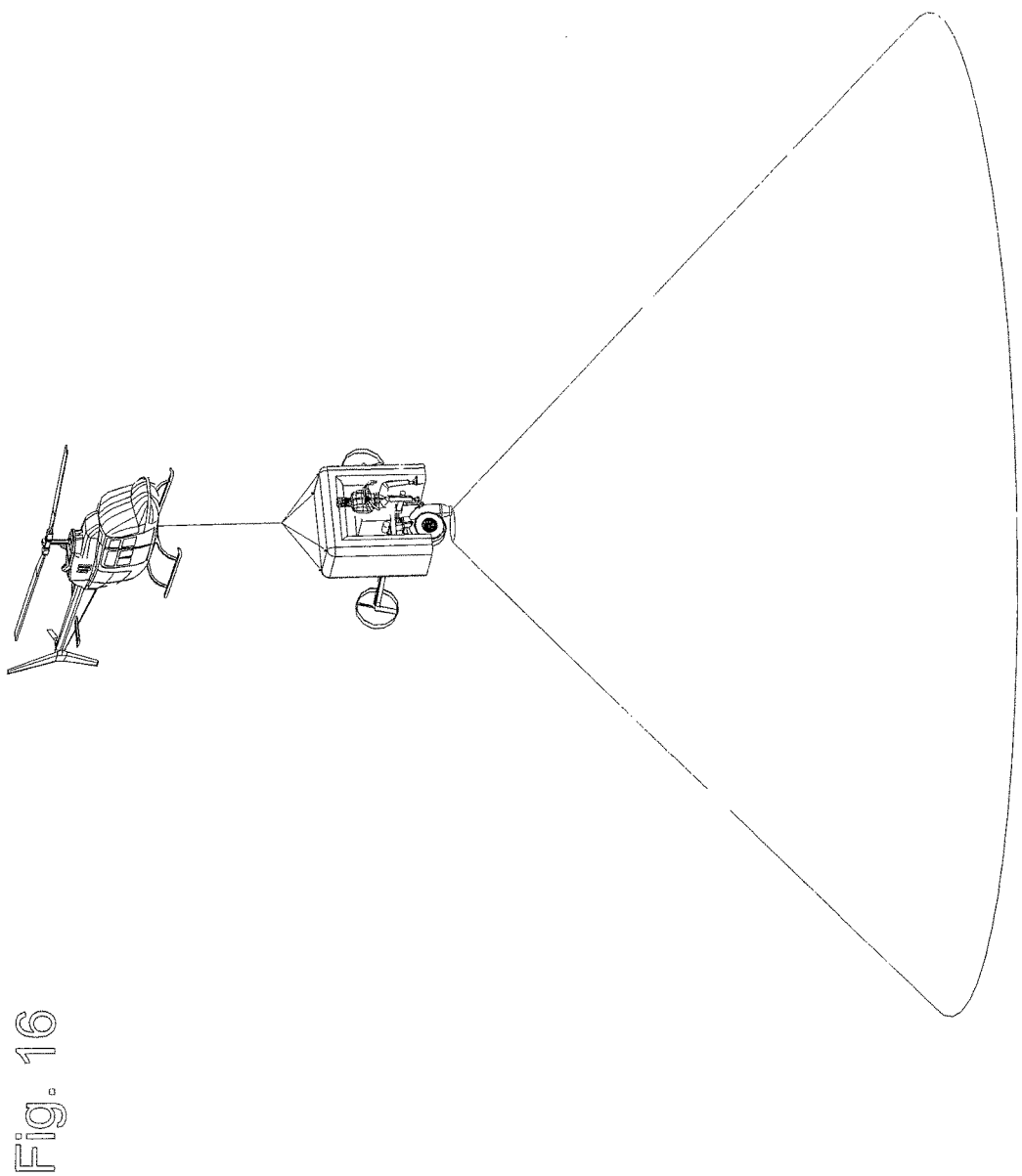
FIG. 16 shows said device in a use position, suspended from a helicopter.

FIGS. 14-16 depict a version of the device for aerial fire-fighting operations (90), which may be suspended from a helicopter (or from another aircraft with the ability to hover or to fly at a low speed), e.g. via steel cables (86). The device includes a Pi-shaped (i.e. having the shape of the capital letter "π" of the Greek alphabet) reservoir (87) for water or other fire extinguishing liquid, having lugs (88) for tying the cables (86) to on its top. The frame (89) on which all other parts of the device are mounted is located within the cavity of the Pi and fastened to the internal sides of the reservoir.

Figure 1:
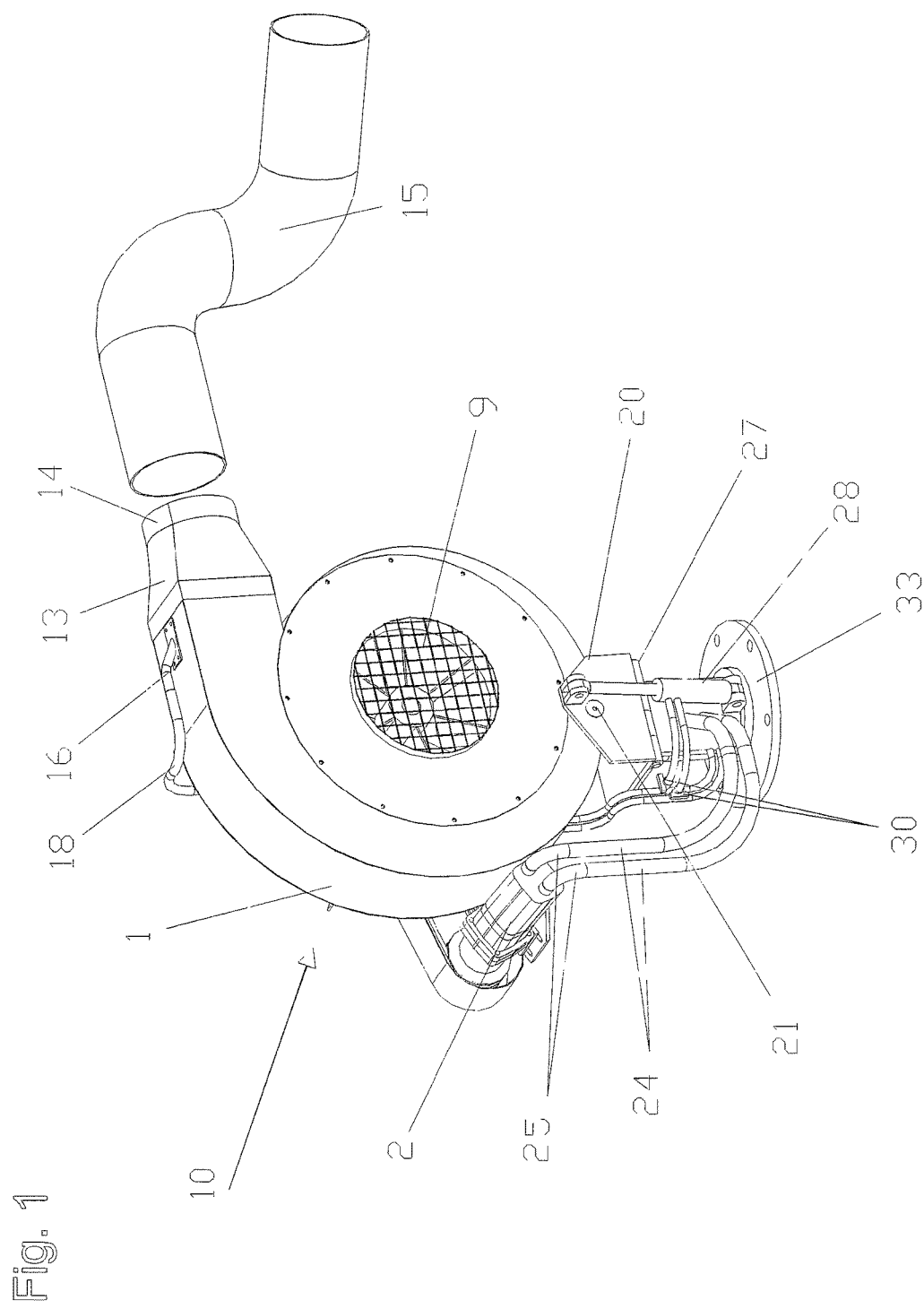
FIG. 1 depicts a remotely controlled version of the device to be mounted on a land vehicle, in a use position (upright), in perspective view, from the right back side.
Figure 2:
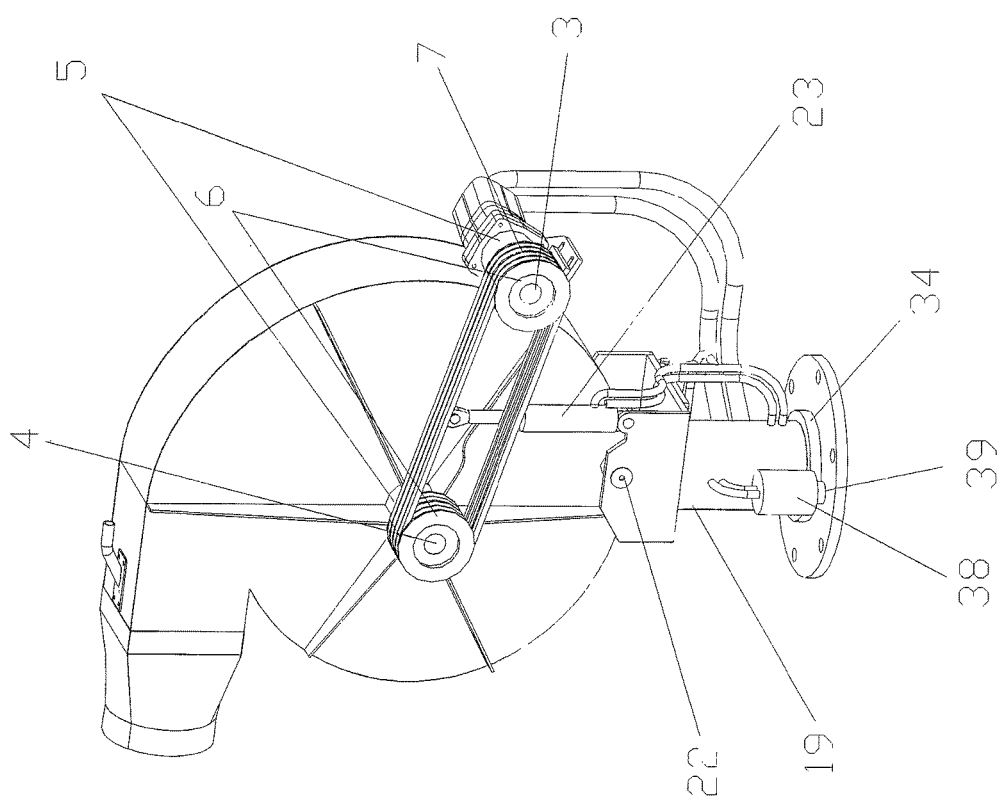
FIG. 2 shows the same device in perspective view, from the left back side.
Figure 3:
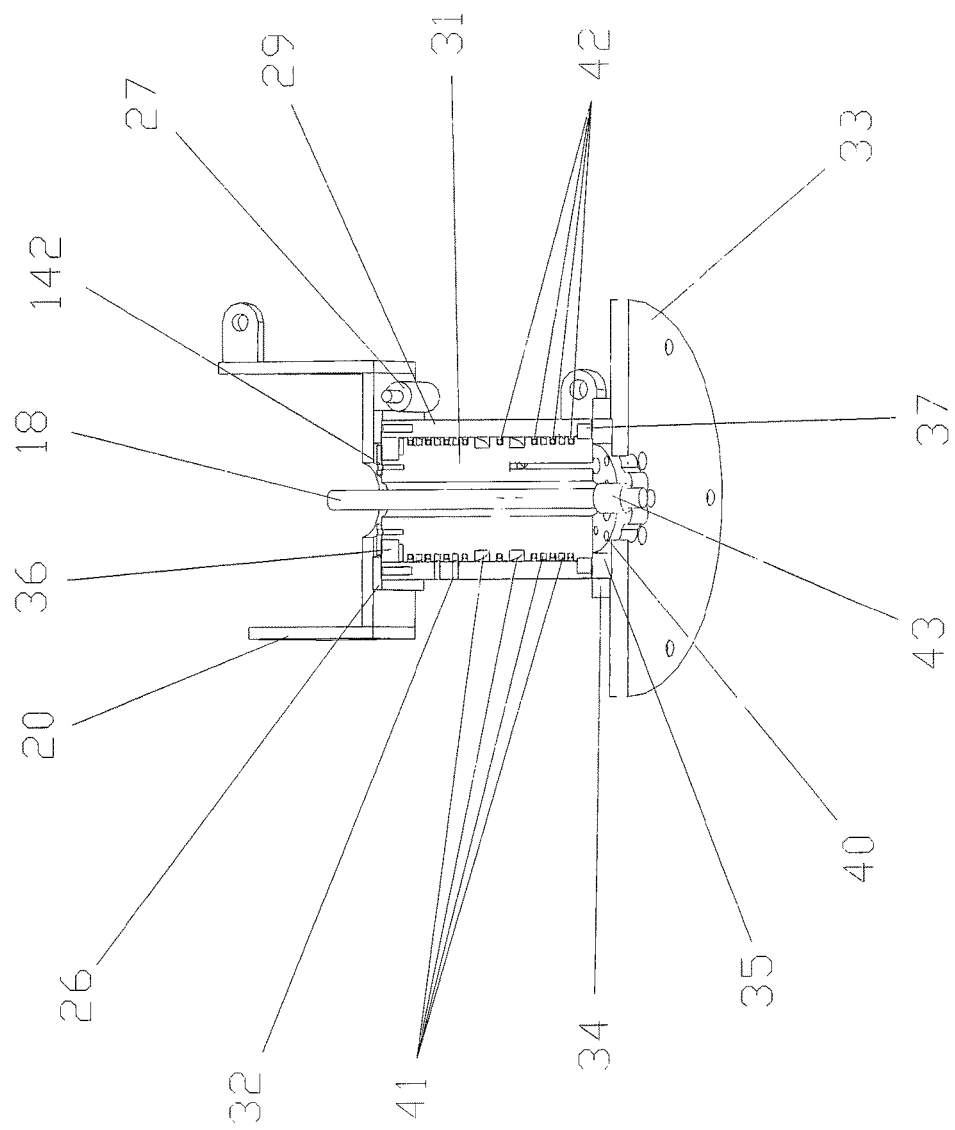
FIG. 3 shows the central support pillar of the device in cross section.

The device of FIGS. 1, 2 is mounted on the bottom side of the frame (89) in the inverse sense, the central pillar (19) and the bases (20), (26) "looking" downwards. A video camera (101) is also fitted to the bottom side of the frame, providing the operator with images of the area beneath and around the device.

Mounted on the top side of the frame (89) is the petrol or diesel engine (91) of the device with its fuel tank, which drives the already known from previous embodiments double oil pump (44), the water or other fire extinguishing liquid pump (92), pumping liquid from the reservoir (87) to the spray nozzles (17) of the device, and a generator producing electricity to cover the device's power requirements. On the top side of the frame are also mounted numerous hydraulic parts of the device, e.g. the electrovalves, the return oil tank (57) and the electric-electronic control systems.

Two arms (93) are pivotally connected to the rear side of the frame (89), each one having a propeller (94) on one end, rotatable within a shroud (95) via a coaxial hydraulic motor (96). Propellers (94) may be moved via hydraulic cylinders (97) from a first position for transport (FIG. 14), wherein the arms (93) are folded behind the reservoir (87), to a second position for use (FIG. 15), wherein the arms (93) and their respective propellers (94) project laterally from different sides of the reservoir (87)—left and right. Both the hydraulic cylinders (97) and the hydraulic motors (96) are fed by the double oil pump (44) arrangement.

The propellers (94) rotate at suitable speeds to counterbalance the forces of generally variable direction exerted on the device by the wind, the discharged spray jet beam and the suspension cables (86) during movement of the helicopter, so that oscillations and instability are avoided. Balance is ensured via a gyroscope (98) borne by the device, which instructs a control panel (99) to appropriately adjust the oil supply to the two hydraulic motors (96). Through the relative adjustment of the rotational speeds of propellers (94) a small rotation of the whole device to the left or to the right may be achieved, even when the helicopter hovers steadily.

Finally, a seat (100) may be fitted to the front side of the frame (89), equipped with controls so that the device may be fully operated by a person seated therein. Alternatively, the use of the device is effected from inside the helicopter via a remote control (47), with the help of the images provided by the downlooking video camera (101).

It should be noted that in case it is not possible for the helicopter to carry the version of the device for aerial fire-fighting operations (90) right from the start, the device may be delivered close to the area on fire by a land vehicle, e.g. on a trailer (FIG. 14). Once suspended from the helicopter and brought over its field of action, the device may cover a circular area of long radius on the ground, as the discharged spray jet beam describes the surface of the respective cone—see FIG. 16.

A simple comparison of the drawings of the version of the device for aerial operations (90) in the present application with FIGS. 10-12 of the device in patent GR1007732 reveals numerous differences between the two. Apart from the fact that the new device uses a centrifugal fan with a spiral housing (1) mounted on a central, rotatable support pillar (19), the following differences are mentioned by way of example:

- The new device preferably uses propellers (94) for its stabilisation or navigation (left-right rotation), although turbines or other propulsion means may be used as well.
- A gyroscope (98) is present to ensure stability.
- The presence of the video camera (101) allows the new device to be remotely controlled.
- The new device is nearly self-sufficient, since it comprises a water or other fire extinguishing liquid reservoir (87) along with its supply pump (92), a fuel tank and a generator, depending on the helicopter solely for its suspension. This feature, which had only been vaguely mentioned as a possibility in GR1007732, is now a fundamental design choice, as it ensures a quick and easy connection of the device to the helicopter.

The portable device (110) of FIGS. 17-20 consists of two subunits attached to each other, with the option of one being rapidly released from the other, even when the device is in use.

The first subunit is the vest (102), worn by the fireman-operator of the device. It consists of a backplate (104) made of flexible plastic, to which are attached both the straps (105) going over the operator's shoulders and the belt (106) to be tied round his waist. The shoulder straps (105) are secured via transverse straps with clip locks (107) at chest height. A plain female socket block (108) is located at the upper part of the backplate (104), having a blind hole (109) of cylindrical shape in its bottom side, with no locking mechanism. Two female socket blocks (111) are located at the bottom part of the backplate (104), one to the left and one to the right, each having a continuous opening extending along its rear and bottom side, and a locking and quick release mechanism (112) which shall be described in detail hereafter.

The second subunit (103) is made up by the rest of the device parts, i.e. the metallic support frame (113) which is attached to a central base (114), metallic as well, said base having mounted thereon a petrol or diesel engine (115) with its fuel tank, the centrifugal fan with the spiral housing (1), its impeller shaft being parallel to the engine's (115) driveshaft, the impeller drive system (116)—consisting of an impeller pulley (117) and a motor pulley (118) coupled via a belt (119), their respective shafts (120), (121) rotating within hubs via bearings (122), (123)—and other parts. The impeller (116) may of course be driven by motor (115) in another way, known in the art, e.g. via a chain-and-sprocket drive or via a direct coupling of its shaft to the motor's driveshaft.

Before the portable device (110) can be used, the second subunit (103) is attached to the vest (102), which is worn by the operator. A tubular extension (124) is attached to the outlet of the spiral housing (1), being substantially horizontal and extending to one side of the operator at the height of the waist belt (106), ending at a frustoconical funnel (13) of gradually reduced cross section. The tubular extension (124) comprises a piece of flexible tube (125) at a convenient for the operator place along its length and the part of the tubular extension (124) downstream of said flexible tube (125) bears a handle (126), so that the operator may aim the spray jet beam discharged from the funnel in the desired direction to put out the fire.

To create the spray, one or more spray nozzles (not shown) are provided inside the tubular extension (124), being fitted to a pipe which has a fitting connection (127) to a source of water or other liquid fire extinguishing medium outside the tubular extension, e.g. via a quick coupler, as well as a manual valve (128) for adjusting the liquid flow rate, at a position easily accessible by the operator.

The source of liquid may theoretically be a liquid tank borne by the operator, forming part of the second subunit (103). Liquid may be supplied to the spray nozzles by a mechanically driven pump, which is driven by the same engine (115) that drives the fan impeller (116). Alternatively, the liquid tank may be a membrane pressure vessel with an inert gas under pressure on the other side of the membrane. Finally, the supply of liquid to the spray nozzles may also be effected through gravity, by placing the liquid tank high within the second subunit (103). In any case, the liquid tank may be of limited capacity only, otherwise the weight of the device would increase excessively. Therefore, a device which includes the water or other fire extinguishing liquid tank, although self-sufficient, is capable of putting out only small fires, which could have also been tackled by a common 6 kg dry powder fire extinguisher. Such fires could be tackled by the device even without liquid, by the sole force of the discharged air stream. Hence, the principal use of the portable device (110) relates to fighting fires of a medium or large size, by connecting it to an external source of water or other fire extinguishing liquid, e.g. a hydrant, a fire engine etc.

Both the ignition switch (129) of the engine (115) and the throttle trigger (130) are located on the handle (126). To start the engine (115) it is necessary not only to set the ignition switch (129) to the "ON" position, but also to pull on the starter cord (131) by its T-shaped handle. When the engine (115) starts, the centrifugal fan impeller (116) begins to rotate, drawing air through the centre of the spiral housing (1), through a protective mesh (9) inhibiting entrainment of debris therein, and supplying it to the tubular extension (124) and the outlet funnel (13). Through the throttle trigger (130) the operator may adjust the engine (115) revolutions and thereby the rotational speed of the impeller (116) and the discharged air stream velocity and flow rate. By opening the valve (128), he also supplies the device with the quantity of liquid necessary to form the spray, said quantity being also adjustable at will.

After putting out the fire the operator deactivates the device by closing the valve (128) and thus interrupting the flow of liquid, and by setting the switch (129) to the "OFF" position and thus switching off the engine (115).

A locking and quick release mechanism (112) is provided for attaching the second subunit (103) to the operator's vest (102). The reason for this is that when the fireman-operator of the device (110) attempts to put out a fire, there is always the possibility that he finds himself at risk, e.g. when the wind direction and intensity change suddenly and the flames approach him or when an explosion occurs nearby, especially since the device comprises a liquid fuel tank as well. Therefore, in case of danger the fireman must be able to flee immediately, the weight of the device (110) hanging from his back making this extremely difficult. Even the small amount of time needed to release the chest clip locks (107) and undo his waist belt (106) may prove valuable in saving his life.

Therefore, the locking and quick release mechanism (112) comprises two pins (132) for locking the support frame (113) to the female socket blocks (111). The locking pins (132) are adapted to be displaced horizontally in the plane of the rear side of the female socket blocks (111), within respective recesses (133) arranged laterally within said blocks. Displacement takes place between a "closed" position (FIG. 20), in which part of each pin (132) projects from the recess (133) and bars the bottom part of the opening in the rear side of the respective block (111) and an "open" position, in which the whole pin (132) is retracted within the recess (133). The locking pins (132) are normally in the "closed" position, biased to project from the recesses (133) by return springs (134). In order to enable displacement to the "open" position, each locking pin (132) is connected to a cable (135), which may pull said pin along its longitudinal axis back inside its respective recess (133), compressing the return spring (134). The two cables meet at a cable splitter (136), so that they may be simultaneously acted upon by a third cable (135) which is led round the front to the operator, so that he may pull on it via the quick release handle (137).

The support frame (113) has a cylindrical stub (138) extending vertically upwards from its upper part for insertion into the blind hole (109) of the vest's plain female socket block (108). The fit is loose and there is no locking feature, so that the cylindrical stub (138) may readily come out of the blind hole (109) in a downward direction. At its lower part and in positions corresponding to the female socket blocks (111), the support frame (113) has two metal hooks (139) of "inverted L" shape, the horizontal member of the inverted L being welded to the support frame (113), its vertical member being free.

In order to attach the second subunit of the device to the vest, the operator mounts the plain female socket block (108) on the support frame cylindrical stub (138), then pulls on the quick release handle (137) to make the locking pins (132) retire within their recesses (133) and inserts the inverted L-shaped hooks (139) of the support frame into the female socket blocks (111). Once the operator lets go of the handle (137), the return springs (134) push the locking pins (132) to their "closed" position, the second subunit (103) now being firmly attached to the vest (102). The horizontal members of the inverted L-shaped hooks (139) sit on the pins (132), while their vertical members prevent the support frame (113) from coming out of the female socket blocks (111).

In case of danger, the fireman-operator of the device (110) can be freed from the second subunit (103) by a simple pull on the quick release handle (137). The cables (135) pull the locking pins inside their recesses (133), hence the inverted L-shaped hooks (139) are free to come out of the openings on the bottom side of the female socket blocks (111), the cylindrical stub (138) also being able to come downwardly out of the blind hole (109) of the plain female socket block (108). Thus, the second subunit (103) falls downwards and the fireman is free to escape. The support frame (113) in conjunction with the central base (114) forms a sturdy bottom surface for mounting parts of the device, which also acts protectively so that the second subunit (103) suffers no damage when hitting the ground and may be used again in case it is retrieved.

It is obvious that the way of attaching the second subunit (103) to the vest (102) is susceptible to various modifications. For example, the locking pins (132) may be of a shape other than the rectangular parallelepiped shape shown in FIG. 4, e.g. they may be cylindrical, the recesses (133) being shaped accordingly. Similarly, the vertical stub (138) and the blind hole (109) may have a non-circular cross section. The plain female socket block (108) may also have two blind holes and the support frame (113) two corresponding vertical stubs or there may be more than one plain female socket blocks. In addition, there may be a single female socket block (111) with one locking pin (132) and, accordingly, a single inverted L-shaped hook (139).

Figure 17:
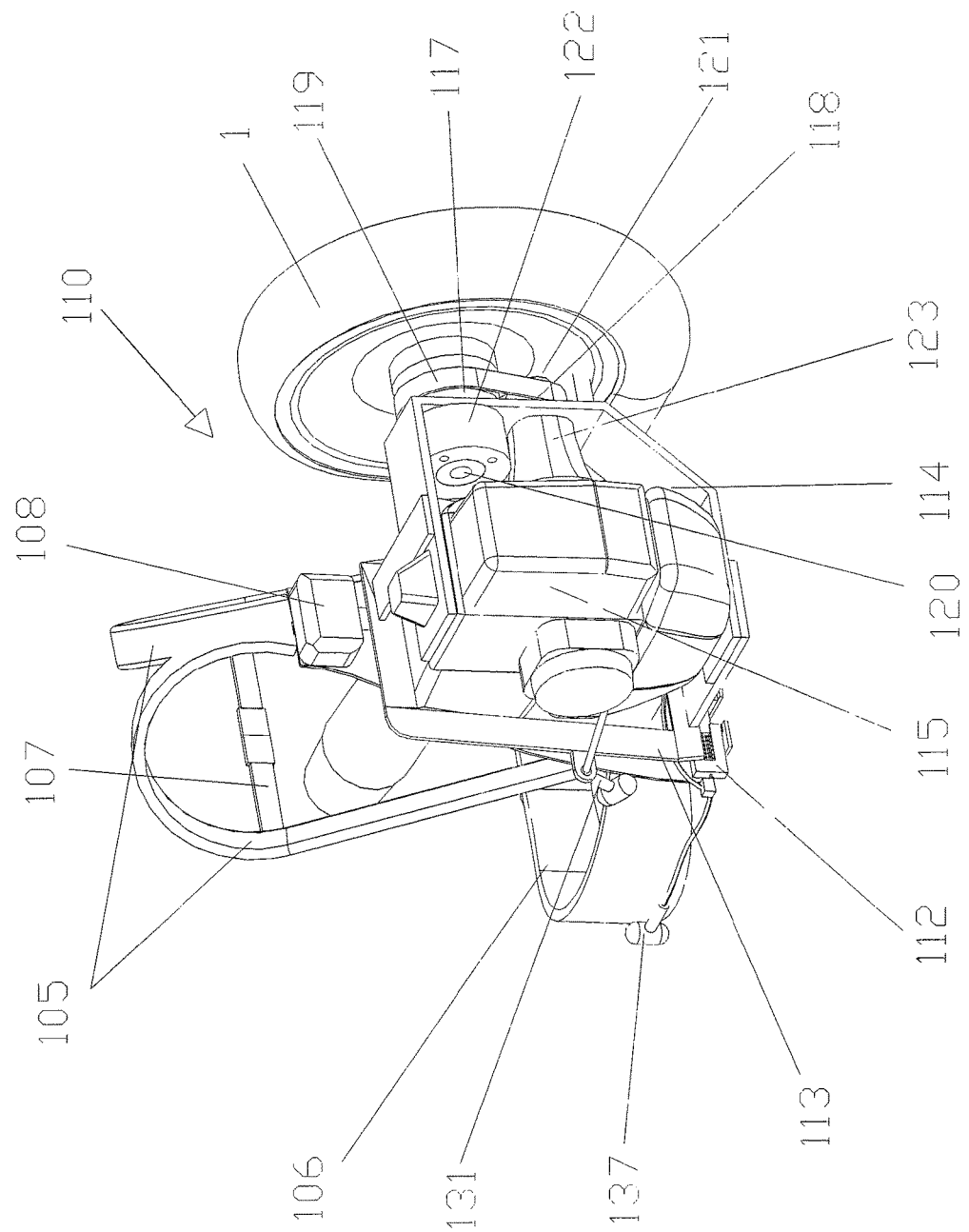
FIG. 17 depicts the portable version of the device in perspective view, from the left back side.
Figure 18:
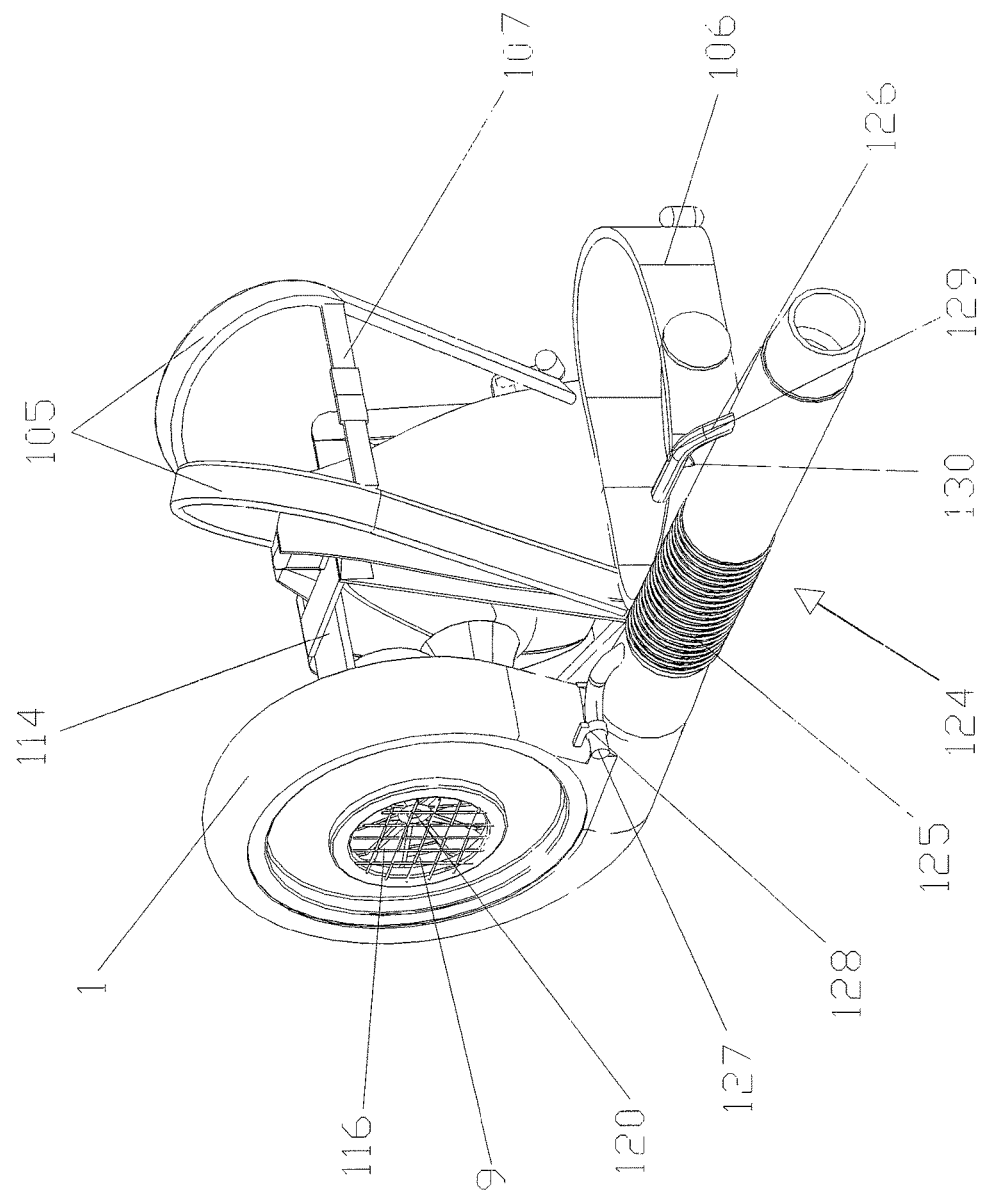
FIG. 18 shows the same device, in perspective view, from the front right side.
Figure 19:
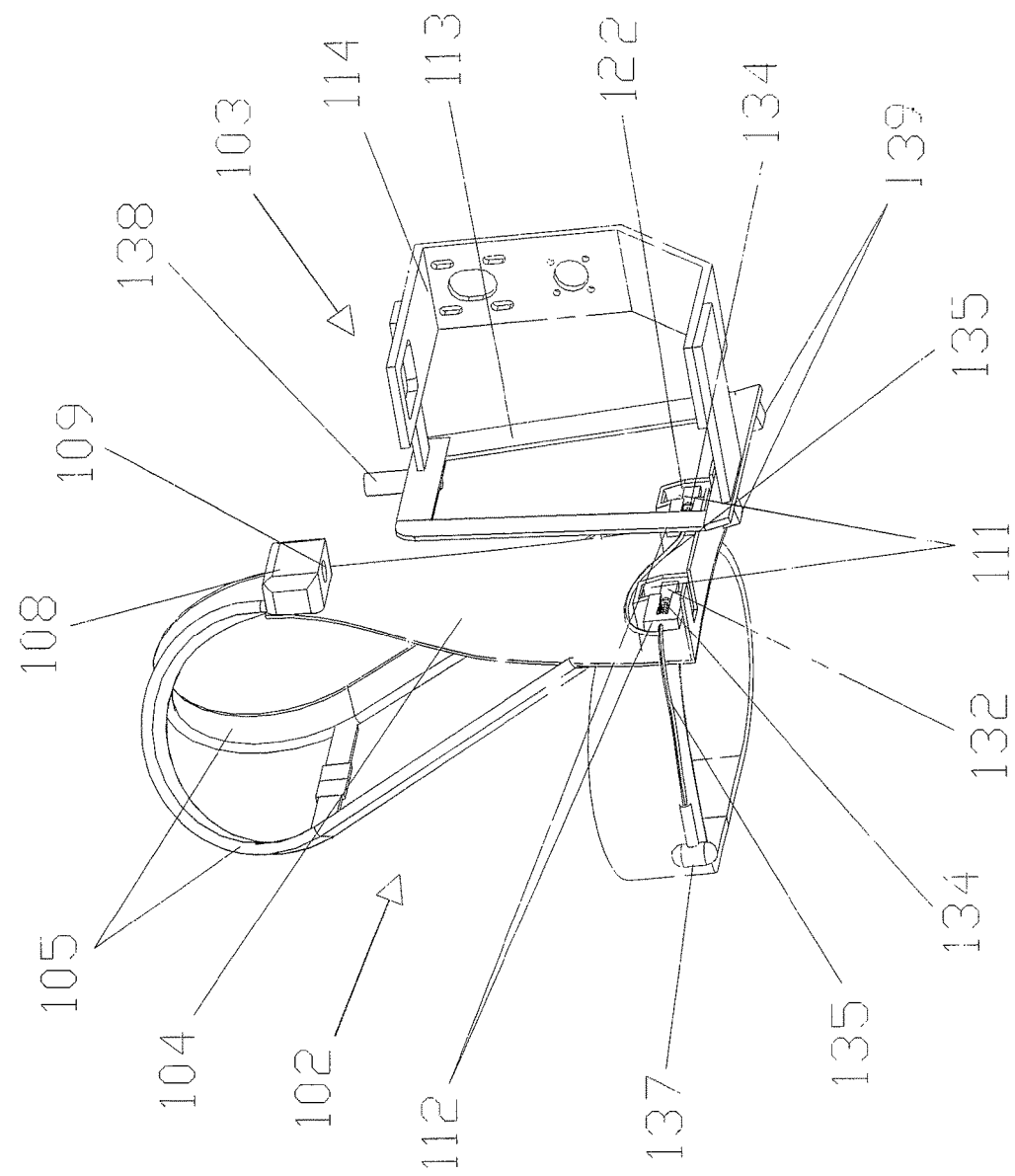
FIG. 19 shows the fireman-operator's vest with the mounting support of the centrifugal fan and the engine driving it detached, in perspective view, from the left back side.

Finally, the arrangement of certain parts of the device on the second subunit (103) may also vary. Thus, while in FIGS. 17 and 18 one may see the centrifugal fan with the spiral housing (1) being arranged laterally, to the operator's right side, the impeller (116) axis lying in the left-right direction, in FIG. 21 the fan is located right behind the operator and the impeller axis lies in the front-rear direction. This last configuration is obviously advantageous in terms of weight distribution (more uniform). Of course, in this case a 90-degree duct elbow (140) is required in order for the tubular extension (124) to have the desired orientation to the operator's side.

The invention is not limited to the embodiments described in detail above. Modifications to certain parts of the device have already been mentioned, but of course more are within the capabilities of the person skilled in the art. For example:

- The motors and drive systems may be of a different type, just as the oil pump (or pumps).
- The funnel (13) need not be frustoconical, as it is in the portable device (110), or a square-to-round reducer, as it is in the remotely controlled (10) or in the manually operated (60) version of the device. It is sufficient that it has a gradually reduced cross section, in order to cause acceleration of the spray jet beam. Likewise, the duct outlet (14) which may be used to straighten the flow anew need not be cylindrical (although this is preferred), it is sufficient that it has a constant cross section.
- The channels of the central oil distributor (31) may follow different paths therein (not axial first, then radial), as long as these are independent, i.e. they do not cross each other, and open out into the circular grooves (41).
- The liquid tank (87) of the version of the device for aerial operations (90) may be of a shape other than the Pi-shape.

Both the remotely controlled (10) and the manually operated (60) version of the device, which have been described above as suitable for mounting on land vehicles, may also be placed at fixed points, e.g. to protect national forests.

The presence of the locking and quick release mechanism (112) described above in relation to the portable device (110) is optional. The second subunit (103) may be detached from the vest (102) in a different way. There may also be no quick release mechanism of the second subunit (103) from the vest (102), the operator being freed from the weight of the whole device (110) by simply undoing his waist belt (106) and unlocking the clip locks (107) of the straps holding the vest on his body.

Furthermore, apart from fire extinguishing, the use of the device for creating visual effects is proposed, wherein the liquid supplied to the spray nozzles (17) is a coloured aqueous solution.

Alternatively, pieces of coloured paper, e.g. confetti, or pieces of similar lightweight materials may be supplied into the air stream, e.g. through the fan (suction) inlet, instead of liquid.

In a further embodiment of the device for creating visual effects, smoke of various colours, generated by one or more smoke bombs, may be supplied to the interior of the centrifugal fan, e.g. through its suction inlet again.

The invention is defined in the following claims.

The invention claimed is:

1. A spray jet discharging device comprising a centrifugal fan with an impeller rotating within a spiral housing (1), a hydraulic motor (2) supplied with oil via a hydraulic circuit (52) for driving the impeller in order to create an air stream, a liquid supply pipe having spray nozzles (17) for spraying the liquid within the air stream in order to create a spray jet beam, and a support for mounting the fan, said device being characterized in that the fan support comprises:

a U-shaped base (20), to which the spiral housing (1) is pivotally connected at two opposite points (21) (22), located one on each opposing arm of the U-shaped base (20), and defining a horizontal axis around which the spiral housing (1) is rotatable, so that an inclination angle of the spray jet beam in a vertical plane may be altered, in an upward or downward direction, a rotatable support pillar (19), comprising a fixed internal trunk of a substantially cylindrical shape, an external jacket (29) surrounding said fixed internal trunk and rotatably mounted thereon around an imaginable vertical axis, said external jacket (29) fixedly connected to the U-shaped base (20), so that its rotation entrains the centrifugal fan into rotation around said vertical axis, causing the spray jet beam to rotate in a horizontal plane, wherein the fixed internal trunk comprises a central oil distributor (31), supplying oil to at least the impeller's hydraulic motor (2), having at least two orifices (40) at its bottom, each one connected to an oil pipe coming from an oil supply pump, the at least two orifices being the inlets to at least two channels extending within the fixed internal trunk, corresponding to at least two circular grooves (41) one to each channel, being located at a different axial height along the fixed internal trunk, so that the external jacket (29) in conjunction with the grooves (41) of the central oil distributor (31), and with seals (42) provided on the at least two grooves (41) define separate, leak proof annular first and second chambers, wherein said chambers form part of the hydraulic circuit (52) of said motor (2), the first chamber as an oil supply line and the second chamber as an oil return line, and wherein the external jacket (29) has a radial through hole (32) opposite to each groove (41), said through holes having means for connection to oil hoses (24) leading to the impeller's hydraulic motor (2) at least;

so that said oil hoses (24) are enabled to follow the movements of said external jacket (29) during horizontal rotation of the device, thereby preventing the oil hoses (24) twisting and interrupting the oil circulation.

2. A spray jet discharging device according to claim 1, characterized in that the central oil distributor (31) has an axial through hole at its center and in that the U-shaped base (20) has a corresponding through hole, through which passes the liquid supply pipe (18) supplying liquid to the spray nozzles (17).

3. A spray jet discharging device according to claim 1, characterized in that the spiral housing (1) has:

a handle (65), via which manual rotation of the centrifugal fan may be effected, both in the horizontal plane, by simultaneous rotation of the U-shaped base (20) and of the external jacket (29) around said vertical axis, and in the vertical plane, around said horizontal axis, wherein the points of pivotal connection (21) (22) between the U-shaped base (20) and the spiral housing (1) are so arranged that a moment of the centrifugal fan's weight around said horizontal axis counteracts a moment produced by a reaction force exerted by the discharged spray jet beam on the device, and a control (61), the hoses (24) supplying oil to the motor (2) passing through said control, which also has means (63) for adjusting the oil flow rate and thereby the rotational speed of the impeller and velocity of the discharged spray jet.

4. A spray jet discharging device according to claim 1, characterized in that:

rotation of the centrifugal fan around said horizontal axis upwards or downwards is effected via a first hydraulic cylinder (23) whose one end is pivotally connected to one of the arms of the U-shaped base (20), its other end being pivotally connected to one side of the spiral housing (1), wherein the first hydraulic cylinder (23) is supplied with oil via a hydraulic circuit (54), rotation of the centrifugal fan around said vertical axis to the left or to the right is effected via a hydraulic motor (38), causing the external jacket (29) to also rotate around the vertical axis, wherein the hydraulic motor is supplied with oil via a hydraulic circuit (55), and the central oil distributor (31) has at least six orifices (40) at its bottom, at least six corresponding channels extending through the central oil distributor (31), and at least six corresponding circular grooves (41), constituting six annular oil chambers, disposed around the central oil distributor (31), and the external jacket (29) comprising at least six radial through holes (32), wherein three pairs of annular oil chambers, orifices (40), channels and radial through holes (32) belong to three hydraulic circuits (52) (54) (55), of the hydraulic motor (2) driving the first hydraulic cylinder (23) for changing the inclination angle of the spray jet beam in the vertical plane, and the hydraulic motor (38) for turning the spray jet beam to the left or to the right, respectively.

5. A spray jet discharging device according to claim 4, characterized in that the hydraulic motor (38) having a vertically oriented driveshaft is mounted on the external jacket (29), wherein said driveshaft carries a pinion (39) which engages with a fixed gear wheel (34), fastened to the substantially cylindrical, fixed internal trunk of the support pillar (19) and coaxial therewith, wherein during rotation of the vertically oriented driveshaft, the pinion (39) rolls on the fixed gear wheel (34), resulting in vertical revolution of the hydraulic motor (38), whereby the external jacket (29) is forced to vertical rotation at the same time.

6. A spray jet discharging device according to claim 4, characterized in that said hydraulic circuits (52) (54) (55), of the hydraulic motor (2) driving the centrifugal fan impeller, of the first hydraulic cylinder (23) for changing the inclination angle of the spray jet beam in the vertical plane, and of the hydraulic motor (38) for turning the spray jet beam to the left or to the right, further comprise electro valves (48) (50) (51) respectively, for controlling the motion of said hydraulic parts, wherein said electro valves (48) (50) (51) are actuated via a remote control (47).

7. A spray jet discharging device according to claim 4, characterized in that the hydraulic circuits (54) (55) of the first hydraulic cylinder (23) for changing the inclination angle of the spray jet beam in the vertical plane, and of the hydraulic motor (38) for turning the spray jet beam to the left or to the right, further comprise electro valves (50) (51) respectively, for controlling the motion of said parts, whereas adjustment of the rotational speed of the hydraulic motor (2) driving the impeller is effected via an actuator controlling the rotational speed of the motor driving the pump which supplies the hydraulic motor (2) with oil, wherein both said electro valves (50) (51) and said actuator are actuated via a remote control (47).

8. A spray jet discharging device according to claim 4, characterized in that a second base (26) is interposed between the U-shaped base (20) and the rotatable support pillar (19), in the form of a plate, which is pivotally connected to the U-shaped base (20), via one or more horizontally disposed hinges (27) bearing an axis, along one edge which is perpendicular to a plane parallel to the arms of the U-shaped base (20), wherein the second base (26) is fixedly connected to the external jacket (29) of the rotatable support pillar (19), rotating therewith and entraining the U-shaped base (20) and the centrifugal fan into rotation to the left or to the right, wherein the U-shaped base (20) has a through hole at its centre for a pipe to pass there through and the second base (26) also has a corresponding through hole, and wherein the U-shaped base (20) may swivel with respect to the second base (26) about the axis of the hinge(s) (27), so that the spiral housing (1) may move between an upright position for using the device and a reclined position.

9. A spray jet discharging device according to claim 8, characterized in that the spray jet discharging device is capable of being moved between the upright and reclined positions manually, and is secured in the upright position by means of a latch (64) being provided for locking the U-shaped base (20) and the second base (26)together.

10. A spray jet discharging device according to claim 8, comprising a hydraulic cylinder (28) for spray jet discharging device displacement between said upright and reclined positions, one end of the hydraulic cylinder (28) being pivotally connected to the rotatable external jacket (29) of the support pillar (19), the other end of hydraulic cylinder (28) being pivotally connected to one arm of the U-shaped base (20) on the same side as the hinge(s) (27), said hydraulic cylinder (28), also being supplied with oil by means of a hydraulic circuit (53) comprising an electro valve (49) for controlling the hydraulic cylinder's (28) motion, wherein the electro valve is actuated via a remote control (47).

11. A spray jet discharging device according to claim 10, characterized in that the hydraulic cylinder (28) is supplied with oil by means of hoses bearing manual valves (30), said hoses branching off an oil supply line and an oil return line of the hydraulic circuit (54) of the first hydraulic cylinder (23) for changing the inclination angle of the spray jet beam in the vertical plane.

12. A spray jet discharging device according to claim 8, mounted upon a vehicle, said device being characterized in that the fan support comprises:

the U-shaped base (20) being arranged parallel to a horizontal plane, the spiral housing (1) being pivotally connected with the arms of the U-shaped base (20) at two points (21) (22) defining an imaginable horizontal axis around which the spiral housing (1) may rotate in order to change the inclination angle of the spray jet beam in a vertical plane, upwards or downwards, a fixed base (26) being vertically arranged and being pivotally connected along one vertical edge to the U-shaped base (20) via one or more hinges (27), wherein the U-shaped base (20) may swivel with respect to the fixed base (26) about the vertical axis of the hinge(s) (27), resulting in that the spiral housing (1) rotates in a horizontal plane, to the left or to the right, and a fixed support pillar (71), with the fixed base (26) attached thereto.

13. A spray jet discharging device according to claim 12, characterized in that:

rotation of the centrifugal fan around said horizontal axis in an upward or downward direction is effected via the first hydraulic cylinder (23), one end of the cylinder being pivotally connected to one of the arms of the U-shaped base (20), its other end being pivotally connected to one of the sides of the spiral housing (1), and swiveling of the U-shaped base (20) with respect to the fixed base (26) about the vertical axis of the hinge(s) (27) to the left or to the right is effected via a second hydraulic cylinder (75), one end of the second hydraulic cylinder being pivotally connected to a bracket (74) extending from the support pillar (71) in a perpendicular direction, the other end of the second hydraulic cylinder being pivotally connected to one arm of the U-shaped base (20)on the same side as the hinge(s) (27).

14. A spray jet discharging device according to claim 13, being suitable for suspension from an aircraft, further comprising:

a frame (89) for inverse mounting of all device parts and the device itself, with the arms of the U-shaped base (20) pointing downwards when the device is in a position for use, a liquid reservoir (87) and a spray liquid pump (92) for supplying liquid to be sprayed via the nozzles (17), in order to create a spray jet, an engine (91), and a fuel tank, wherein the engine (91) drives at least one oil pump (44) supplying oil to the first and second hydraulic circuits of the spray jet discharging device, the spray liquid pump (92) supplying the liquid to be sprayed and a generator producing electricity to cover the device's power requirements, at least two motors (96) driving at least two propulsion means (94), each propulsion means having an axis of rotation, arranged one on the left and one on the right of the device, wherein the axes of rotation are positioned parallel to one another and substantially horizontal to a surface below, and the motors (96) having rotational speeds which drive said propulsion means (94), being individually adjustable via a control panel (99), so that balancing of the jet discharging device and rotation of the jet discharging device to the left or to the right is enabled, a gyroscope (98), instructing said control panel (99), and a video camera (101) for recording images of the device's field of action.

15. A spray jet discharging device according to claim 14, characterized in that said propulsion means (94) are borne by at least two arms (93) pivotally connected to the mounting frame (89), said arms being movable via frame hydraulic cylinders (97) between a folded position for transport of the device and an extended position for use of the device, further comprising a seat (100) equipped with controls and attached to the mounting frame, so that the spray jet discharging device may be either operated by a person seated therein, or by means of a remote control (47) from inside the aircraft, with the help of the images provided by said video camera (101).

16. A spray jet discharging device according to claim 1, characterized in that a spray jet discharging device outlet is an outlet of the spiral housing (1).

17. A spray jet discharging device according to claim 16, characterized in that a funnel (13) of gradually reduced cross section is fitted to the spiral housing (1) outlet, whereby the spray jet discharging device outlet is a funnel (13) outlet connected to a duct (14) of a constant cross section which straightens a flow of the spray jet discharging device before discharge, whereby the device outlet is an outlet of the duct.

18. A spray jet discharging device according to claim 14, characterized in that the centrifugal fan with an impeller rotating within a spiral housing (1) is mounted on an articulated arm (76), allowing a continuous rotation of the device through 360°, furthermore characterized in that power for the movement of the at least one oil pump (44), the spray liquid pump (92), the first and second hydraulic cylinders and motors is generated by means of an engine of the vehicle to which the spray jet discharging device is mounted.

19. A spray jet discharging device according to claim 18, characterized in that the centrifugal fan with an impeller rotating within a spiral housing (1) is mounted on the articulated arm (76), so that the continuous rotation of the device through 360° is obtained, furthermore characterized in that the movement of all the pumps for driving the hydraulic cylinders, the hydraulic motors, and the centrifugal fan, is being generated by means of a second engine.

20. A spray jet discharging device according to claim 1, characterized in that the central oil distributor (31) has an axial through hole at its center and in that the U-shaped base (20) has a corresponding through hole, whereby said through holes accommodate a liquid supply pipe (18), and the liquid supply pipe (18) further comprising a rotary coupling (43) at a point in the vertical route.

* * * * *